(12) United States Patent
Lee et al.

(10) Patent No.: US 10,725,578 B2
(45) Date of Patent: Jul. 28, 2020

(54) APPARATUS AND METHOD FOR CONTROLLING FINGERPRINT SENSOR

(71) Applicant: Samsung Electronics Co., Ltd., Gyeonggi-do (KR)

(72) Inventors: Siwoo Lee, Gyeongsangbuk-do (KR); Kwonseung Shin, Gyeonggi-do (KR); Jeongseob Kim, Daegu (KR); Yonggil Han, Gyeongsangbuk-do (KR); Hyeonho Kim, Gyeongsangbuk-do (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 68 days.

(21) Appl. No.: 15/866,791

(22) Filed: Jan. 10, 2018

(65) Prior Publication Data
US 2018/0224999 A1 Aug. 9, 2018

(30) Foreign Application Priority Data
Feb. 3, 2017 (KR) .................. 10-2017-0015427

(51) Int. Cl.
*G06F 3/0484* (2013.01)
*G06F 3/041* (2006.01)
(Continued)

(52) U.S. Cl.
CPC .......... *G06F 3/0416* (2013.01); *G06F 3/0488* (2013.01); *G06F 3/04842* (2013.01);
(Continued)

(58) Field of Classification Search
CPC ...... G06F 3/0488; G06F 3/0416; G06F 21/32; G06F 3/04842; G06K 9/00006; G06K 9/0002
See application file for complete search history.

(56) References Cited

U.S. PATENT DOCUMENTS

| 7,864,992 B2 | 1/2011 | Riedijk et al. |
| 2009/0279742 A1* | 11/2009 | Abiko ............... G06K 9/00026 382/107 |

(Continued)

FOREIGN PATENT DOCUMENTS

| EP | 3 032 385 A1 | 6/2016 |
| EP | 3 239 879 A1 | 11/2017 |

(Continued)

OTHER PUBLICATIONS

European Search Report dated Mar. 27, 2018.

*Primary Examiner* — Towfiq Elahi
(74) *Attorney, Agent, or Firm* — Cha & Reiter, LLC

(57) ABSTRACT

Disclosed herein are an electronic device and method. The electronic device includes a touch screen, at least one fingerprint sensor disposed on the touch screen, and a processor implementing the method, including controlling the touch screen to display one or more graphic objects, detecting attribute information of at least one graphic object associated with a fingerprint sensor disposed on at least a part of the touch screen from among the one or more graphic objects, activating an area of the fingerprint sensor based on the attribute information, the activated area of the fingerprint sensor corresponding to the at least one graphic object, and acquiring fingerprint information through the activated area of the fingerprint sensor.

20 Claims, 27 Drawing Sheets

(51) Int. Cl.
  *H04W 12/08* (2009.01)
  *H04W 12/06* (2009.01)
  *H04L 29/06* (2006.01)
(52) U.S. Cl.
  CPC ........... *G06F 21/32* (2013.01); *G06K 9/0002* (2013.01); *G06K 9/00013* (2013.01); *G06K 9/00087* (2013.01); *G06K 9/22* (2013.01); *G06F 2203/04112* (2013.01); *G06F 2203/04803* (2013.01); *H04L 63/0861* (2013.01); *H04W 12/06* (2013.01); *H04W 12/08* (2013.01)

(56) References Cited

U.S. PATENT DOCUMENTS

| | | |
|---|---|---|
| 2015/0054764 A1 | 2/2015 | Kim et al. |
| 2015/0116086 A1 | 4/2015 | Kim et al. |
| 2015/0371073 A1 | 12/2015 | Cho et al. |
| 2016/0092018 A1* | 3/2016 | Lee .......... G06F 21/32 345/173 |
| 2016/0171281 A1* | 6/2016 | Park ............ G06F 1/1643 382/124 |
| 2016/0246396 A1 | 8/2016 | Dickinson et al. |
| 2017/0316250 A1 | 11/2017 | Roh et al. |

FOREIGN PATENT DOCUMENTS

| | | |
|---|---|---|
| KR | 10-2006-0063571 A | 6/2006 |
| KR | 10-2015-0022455 A | 3/2015 |
| KR | 10-2015-0049550 A | 5/2015 |
| KR | 10-2016-0033330 A | 3/2016 |
| KR | 10-2016-0043217 A | 4/2016 |
| KR | 10-2016-0096257 A | 8/2016 |
| WO | 2016/133602 A1 | 8/2016 |

* cited by examiner

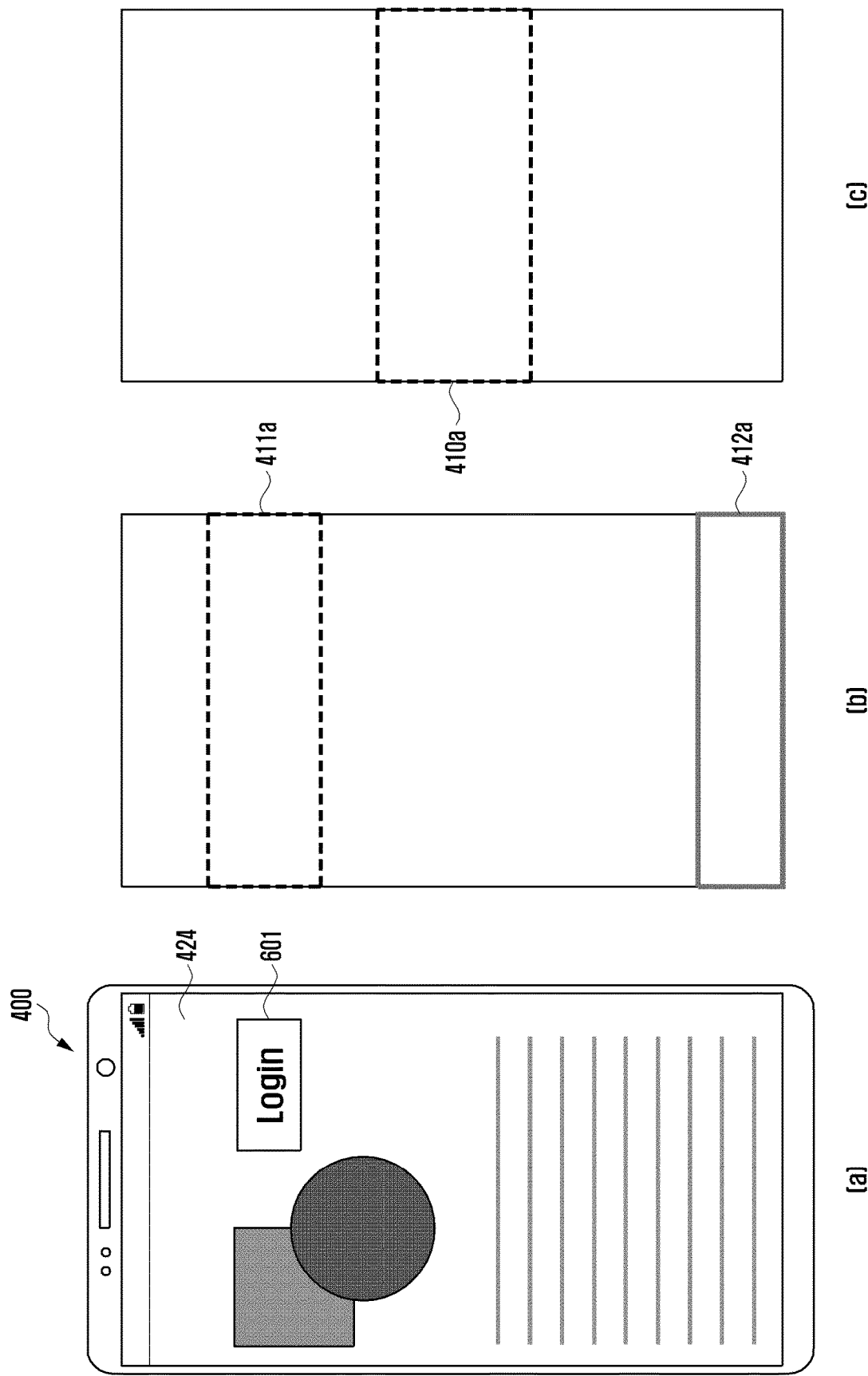

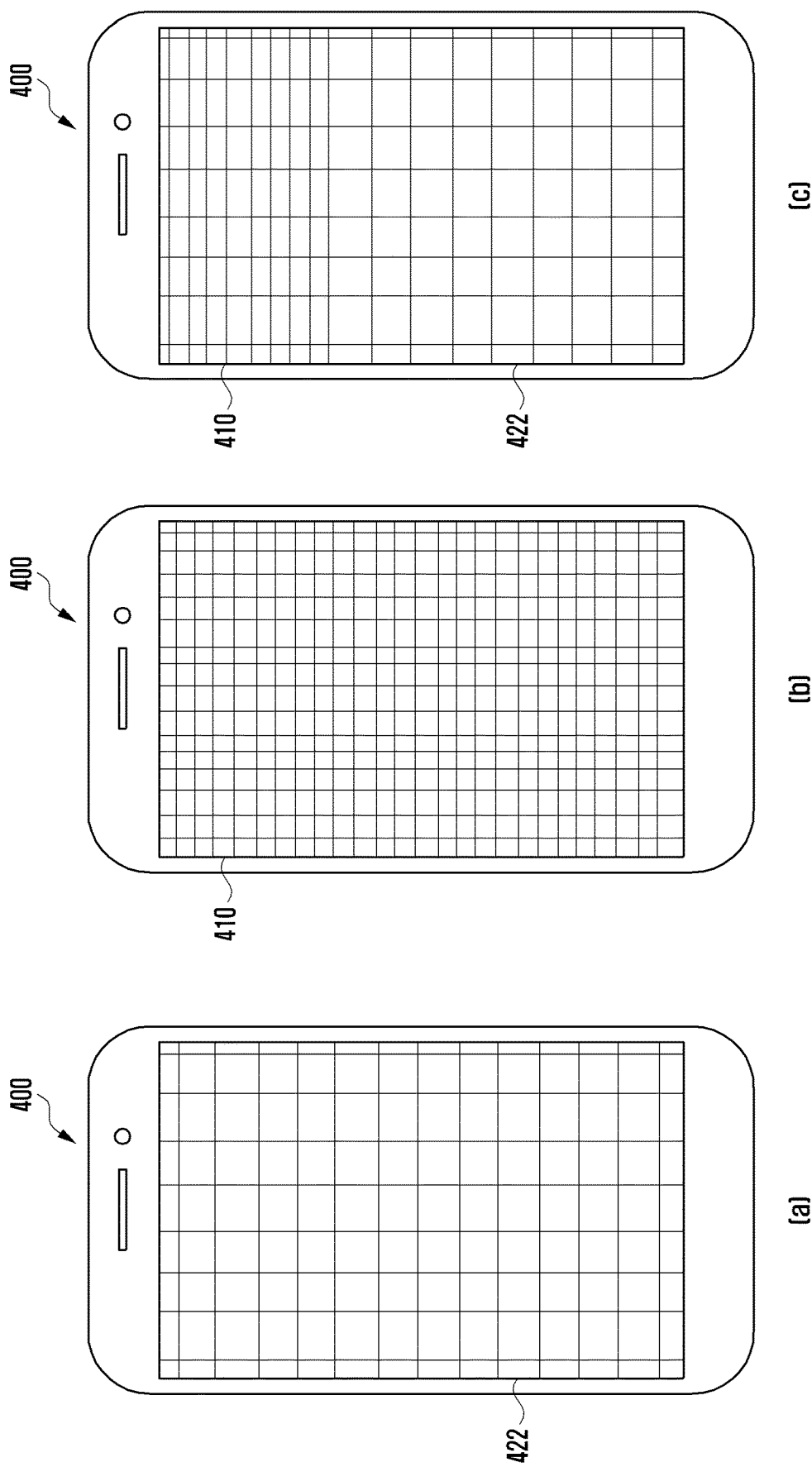

APPARATUS AND METHOD FOR CONTROLLING FINGERPRINT SENSOR

CLAIM OF PRIORITY

This application claims the benefit under 35 U.S.C. § 119(a) of Korean patent application filed on Feb. 3, 2017 in the Korean Intellectual Property Office and assigned Serial number 10-2017-0015427, the entire disclosure of which is hereby incorporated by reference.

TECHNICAL FIELD

Various embodiments of the present disclosure relate to an apparatus and method for controlling a fingerprint sensor to obtain a user's fingerprint in an electronic device.

BACKGROUND

Today, most of electronic devices have various security functions to protect user's personal or privacy information.

For example, electronic devices may use a fingerprint recognition service as one of such security functions. The fingerprint recognition service is applied for security authentication of electronic devices.

Normally, in the fingerprint recognition service applied to electronic devices, a fingerprint input area for fingerprint sensing is located differently from a user interface (UI) object area recognized by the user. Accordingly, this may often cause difficulty in facilitating intuitive input actions.

SUMMARY

Various embodiments of the present disclosure are directed to an apparatus and method for controlling a fingerprint sensor of an electronic device. In particular, embodiments of the present disclosure provide an optimal scheme of acquiring user fingerprint information in an electronic device, while improving a fingerprint recognition speed and reducing battery consumption.

According to various embodiments of the present disclosure, an electronic device may include a touch screen, at least one fingerprint sensor disposed on at least a part of the touch screen, and a processor electrically coupled to the touch screen and the at least one fingerprint sensor. The processor is configured to control the touch screen to display one or more graphic objects, detect attribute information of at least one graphic object associated with the fingerprint sensor from among the one or more graphic objects, activate an area of the fingerprint sensor corresponding to the at least one graphic object based on the attribute information, and acquire fingerprint information through the activated area.

According to various embodiments of the present disclosure, a method for controlling an electronic device is disclose, including controlling a touch screen to display one or more graphic objects, detecting attribute information of at least one graphic object associated with a fingerprint sensor disposed on at least a part of the touch screen from among the one or more graphic objects, activating an area of the fingerprint sensor based on the attribute information, the activated area of the fingerprint sensor corresponding to the at least one graphic object, and acquiring fingerprint information through the activated area of the fingerprint sensor.

According to various embodiments of the present disclosure, a non-transitory computer-readable recording medium records programming instructions executable by a processor to control a touch screen to display one or more graphic objects, detect attribute information of at least one graphic object associated with a fingerprint sensor disposed on at least a part of the touch screen from among the one or more graphic objects, activate an area of the fingerprint sensor based on the attribute information, the activated area of the fingerprint sensor corresponding to the at least one graphic object, and acquire fingerprint information through the activated area of the fingerprint sensor. According to various embodiments of the present disclosure, an electronic device can efficiently acquire a user's fingerprint, thereby improving a fingerprint recognition speed and reducing battery consumption.

According to various embodiments of the present disclosure, a processor of an electronic device can determine an optimized fingerprint sensing area for scanning a user's fingerprint. By performing a scan in the determined fingerprint sensing area, a fingerprint scanning speed can be reduced. Also, by minimizing a scan area, the battery consumption can be reduced.

BRIEF DESCRIPTION OF THE DRAWINGS

FIG. 16 is a diagram illustrating an example of partly activating a fingerprint sensing area in an electronic device having at least one fingerprint sensor disposed partially in a display according to various embodiments of the present disclosure.

FIG. 17 is a diagram illustrating a method for performing touch acquisition and fingerprint acquisition through different scan frequencies in an electronic device according to various embodiments of the present disclosure.

DETAILED DESCRIPTION

Figure 1:
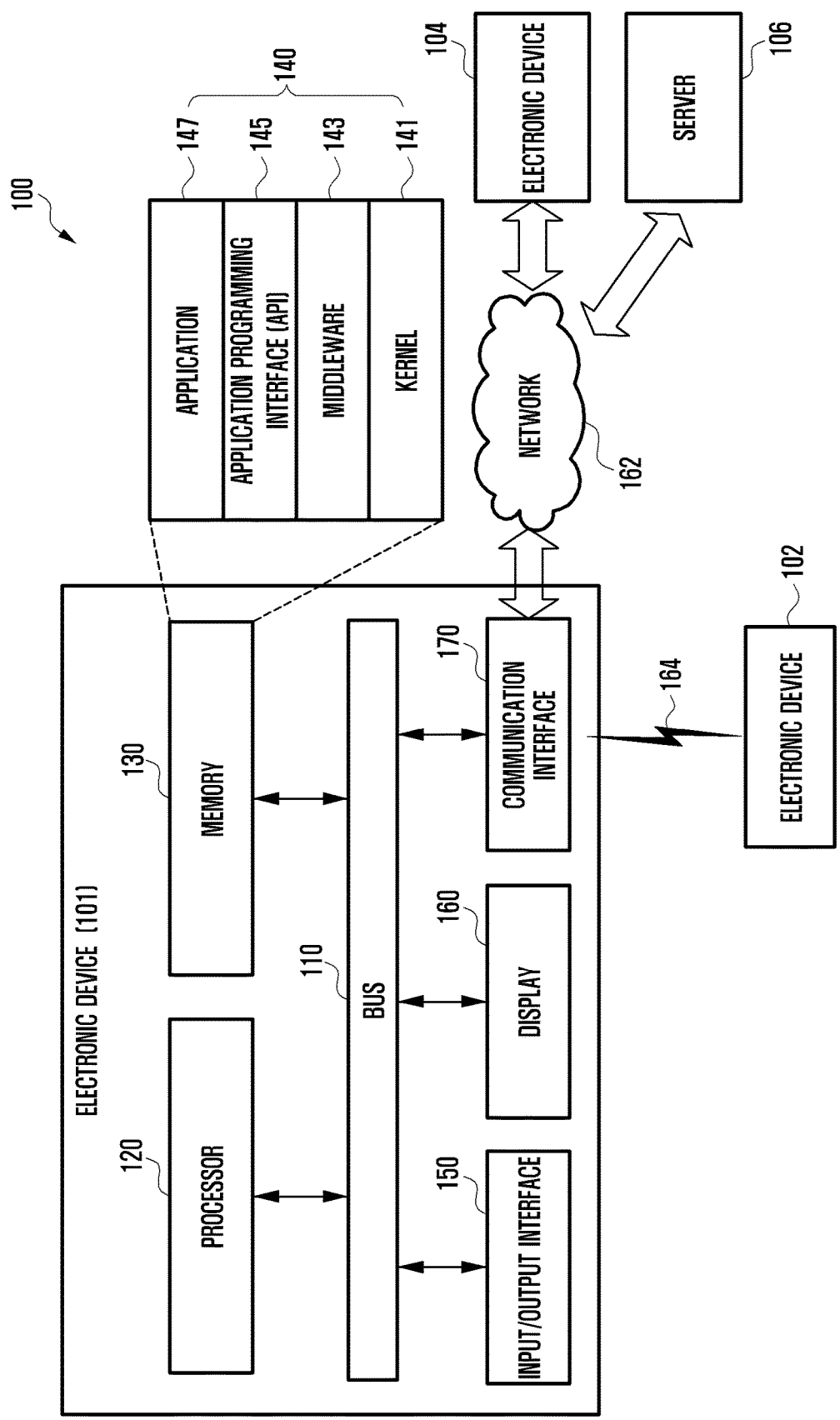
FIG. 1 is a diagram illustrating a network environment including an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely examples. Accordingly, those of ordinary skill in the art will recognize that various changes and modifications of the various embodiments described herein can be made without departing from the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the present disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context.

For example, "a processor configured to (set to) perform A, B, and C" may mean a dedicated processor (e.g., an embedded processor) for performing a corresponding operation, or a generic-purpose processor (e.g., a central processing unit (CPU) or an application processor) capable of performing a corresponding operation by executing one or more software programs stored in a memory device.

The terms used in describing various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

Electronic devices according to embodiments of the present disclosure may include at least one of, for example, smart phones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to an embodiment of the present disclosure, the wearable devices may include at least one of accessory-type wearable devices (e.g., watches, rings, bracelets, anklets, necklaces, glasses, contact lenses, or head-mounted-devices (HMDs)), fabric or clothing integral wearable devices (e.g., electronic clothes), body-mounted wearable devices (e.g., skin pads or tattoos), or implantable wearable devices (e.g., implantable circuits).

The electronic devices may be smart home appliances. The smart home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ and PlayStation™), electronic dictionaries, electronic keys, camcorders, or electronic picture frames.

The electronic devices may include at least one of various medical devices (e.g., various portable medical measurement devices (such as blood glucose meters, heart rate monitors, blood pressure monitors, or thermometers, and the like), a magnetic resonance angiography (MRA) device, a magnetic resonance imaging (MRI) device, a computed tomography (CT) device, scanners, or ultrasonic devices, and the like), navigation devices, global positioning system (GPS) receivers, event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller machines (ATMs), points of sales (POSs) devices, or Internet of Things (IoT) devices (e.g., light bulbs, various sensors, electric or gas meters, sprinkler devices, fire alarms, thermostats, street lamps, toasters, exercise equipment, hot water tanks, heaters, boilers, and the like).

The electronic devices may further include at least one of parts of furniture or buildings/structures, electronic boards, electronic signature receiving devices, projectors, or various measuring instruments (such as water meters, electricity meters, gas meters, or wave meters, and the like). The electronic devices may be one or more combinations of the above-mentioned devices. The electronic devices may be flexible electronic devices. Also, the electronic devices are not limited to the above-mentioned devices, and may include new electronic devices according to the development of new technologies.

Hereinafter, electronic devices according to various embodiments of the present disclosure will be described with reference to the accompanying drawings. The term "user" as used herein may refer to a person who uses an electronic device or may refer to a device (e.g., an artificial intelligence electronic device) which uses an electronic device.

FIG. 1 illustrates a network environment including an electronic device according to an embodiment of the present disclosure.

Referring to FIG. 1, a network environment 100 includes an electronic device 101 having a bus 110, a processor 120, a memory 130, an input/output interface 150, a display 160, and a communication interface 170. At least one of the above described components may be omitted from the electronic device 101 or another component may be further included in the electronic device 101.

The bus 110 may be a circuit connecting the above described components 120, 130, and 150-170 and transmitting communications (e.g., control messages and/or data) between the above described components.

The processor 120 may include one or more of a CPU, an application processor (AP), and a communication processor (CP). The processor 120 is capable of controlling at least one of other components of the electronic device 101 and/or processing data or operations related to communication.

The memory 130 may include volatile memory and/or non-volatile memory. The memory 130 is capable of storing data or commands related to at least one of other components of the electronic device 101. The memory 130 is capable of storing software and/or a program module 140. For example, the program module 140 may include a kernel 141, middleware 143, an application programming interface (API) 145, application programs (or applications) 147, etc. The kernel 141, the middleware 143 or at least part of the API 145 may be called an operating system (OS).

The kernel 141 is capable of controlling or managing system resources (e.g., the bus 110, the processor 120, the memory 130, etc.) used to execute operations or functions of other programs (e.g., the middleware 143, the API 145, and the application programs 147). The kernel 141 provides an interface capable of allowing the middleware 143, the API 145, and the application programs 147 to access and control/manage the individual components of the electronic device 101.

The middleware 143 may be an interface between the API 145 or the application programs 147 and the kernel 141 so that the API 145 or the application programs 147 can communicate with the kernel 141 and exchange data therewith. The middleware 143 is capable of processing one or more task requests received from the application programs 147 according to the priority. For example, the middleware 143 is capable of assigning a priority for use of system resources of the electronic device 101 (e.g., the bus 110, the processor 120, the memory 130, etc.) to at least one of the application programs 147. For example, the middleware 143 processes one or more task requests according to a priority assigned to at least one application program, thereby performing scheduling or load balancing for the task requests.

The API 145 may be an interface that is configured to allow the application programs 147 to control functions provided by the kernel 141 or the middleware 143. The API 145 may include at least one interface or function (e.g., instructions) for file control, window control, image process, text control, or the like.

The input/output interface 150 is capable of transferring instructions or data, received from the user or external devices, to one or more components of the electronic device 101. The input/output interface 150 is capable of outputting instructions or data, received from one or more components of the electronic device 101, to the user or external devices.

The display 160 may include a liquid crystal display (LCD), a flexible display, a transparent display, a light emitting diode (LED) display, an organic LED (OLED) display, micro-Electro-mechanical systems (MEMS) display, an electronic paper display, etc. The display 160 is capable of displaying various types of content (e.g., texts, images, videos, icons, symbols, etc.). The display 160 may also be implemented with a touch screen. In this case, the display 160 is capable of receiving touches, gestures, proximity inputs or hovering inputs, via a stylus pen, or a user's body.

The communication interface 170 is capable of establishing communication between the electronic device 101 and an external device. For example, the communication interface 170 is capable of communicating with an external device connected to a network 162 via wired or wireless communication.

Wireless communication may employ, as cellular communication protocol, at least one of long-term evolution (LTE), LTE Advance (LTE-A), code division multiple access (CDMA), wideband CDMA (WCDMA), universal mobile telecommunications system (UMTS), wireless broadband (WiBro), and global system for mobile communication (GSM). Wireless communication may also include short-wireless communication 164. Short-wireless communication 164 may include at least one of wireless fidelity (Wi-Fi), Bluetooth (BT), near field communication (NFC), magnetic secure transmission (MST), and global navigation satellite system (GNSS). The GNSS may include at least one of GPS, global navigation satellite system (Glonass), Beidou NSS (Beidou), Galileo, the European global satellite-based navigation system, according to GNSS using areas, bandwidths, etc. In the present disclosure, "GPS" and "GNSS" may be used interchangeably. Wired communication may include at least one of universal serial bus (USB), high definition multimedia interface (HDMI), recommended standard 232 (RS-232), and plain old telephone service (POTS). The network 162 may include at least one of the following: a telecommunications network, e.g., a computer network (e.g., local area network (LAN) or wide area network (WAN)), the Internet, and a telephone network.

A first external electronic device 102 and a second external electronic device 104 are each identical to or different from the electronic device 101, in terms of type. According to an embodiment, a server 106 is capable of including a group of one or more servers. According to various embodiments, part or all of the operations executed on the electronic device 101 may be executed on another electronic device or a plurality of other electronic devices (e.g., electronic devices 102 and 104 or a server 106). According to an embodiment, when the electronic device needs to perform a function or service automatically or according to a request, it does not perform the function or service, but is capable of additionally requesting at least part of the function related to the function or service from another electronic device (e.g., electronic devices 102 and 104 or a server 106). The other electronic device (e.g., electronic devices 102 and 104 or a server 106) is capable of executing the requested function or additional functions, and transmitting the result to the electronic device 101. The electronic device 101 processes the received result, or further proceeds with additional processes, to provide the requested function or service. To this end, the electronic device 101 may employ cloud computing, distributed computing, or client-server computing technology.

Figure 2:
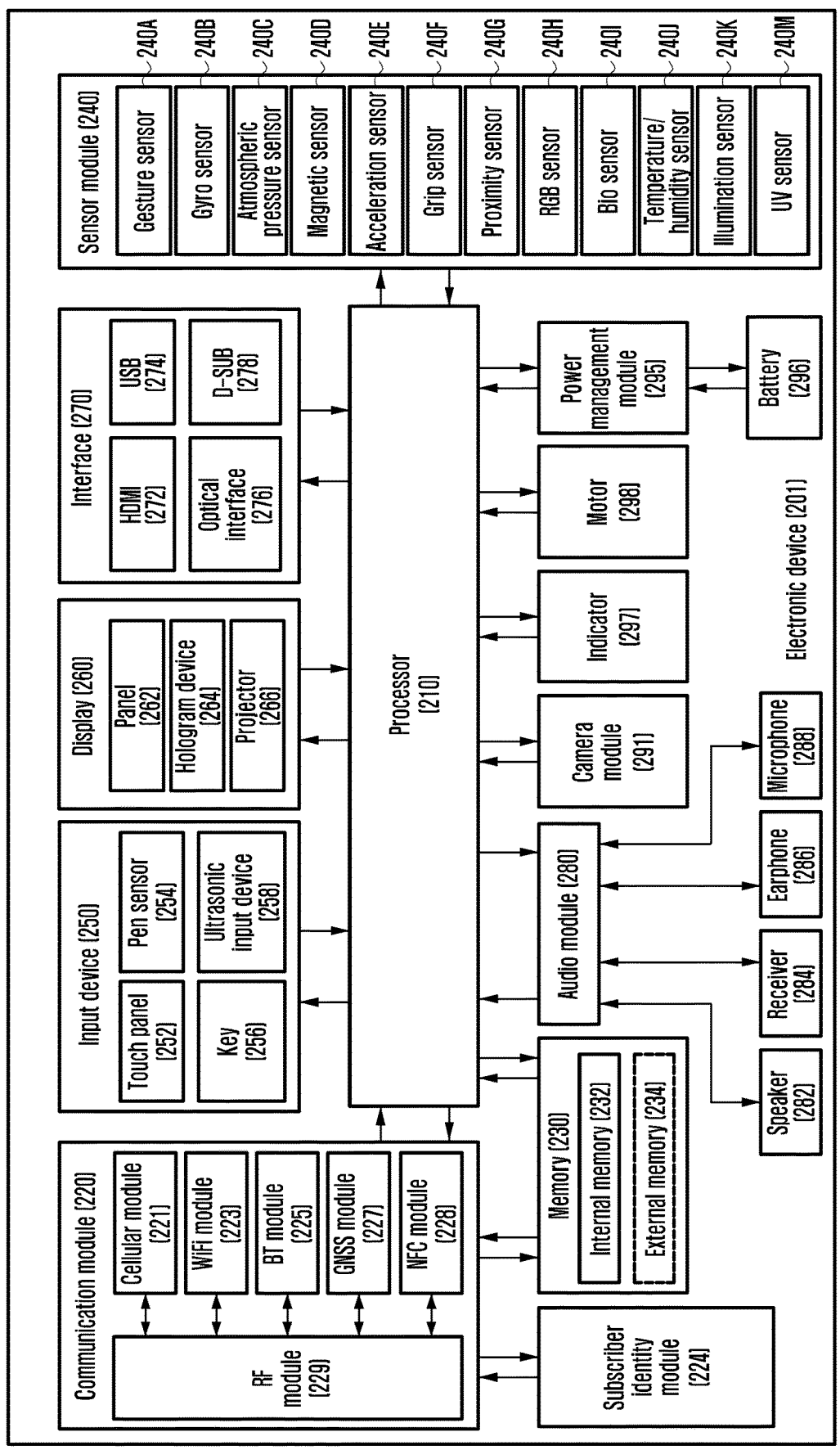
FIG. 2 is a block diagram illustrating an electronic device according to various embodiments of the present disclosure.

FIG. 2 is a block diagram showing a configuration of an electronic device according to an embodiment of the present disclosure.

Referring to FIG. 2, an electronic device 201 may include a part or all of the components in the electronic device 101 shown in FIG. 1. The electronic device 201 may include one or more processors 210 (e.g., APs), a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 is capable of driving, for example, an operating system or an application program to control a plurality of hardware or software components connected to the processor 210, processing various data, and performing operations. The processor 210 may be implemented as, for example, a system on chip (SoC). The processor 210 may further include a graphic processing unit (GPU) and/or an image signal processor. The processor 210 may also include at least part of the components shown in FIG. 2, e.g., a cellular module 221. The processor 210 is capable of loading commands or data received from at least one of other components (e.g., a non-volatile memory) on a volatile memory, processing the loaded commands or data. The processor 210 is capable of storing various data in a non-volatile memory.

The communication module 220 may include the same or similar configurations as the communication interface 170 shown in FIG. 1. For example, the communication interface 170 is capable of including the cellular module 221, a Wi-Fi module 223, a Bluetooth (BT) module 225, a GPS module 227 (e.g., a GNSS module, Glonass module, Beidou module or Galileo module), an NFC module 228, and a radio frequency (RF) module 229.

The cellular module 221 is capable of providing a voice call, a video call, an SMS service, an Internet service, etc., through a communication network, for example. The cellular module 221 is capable of identifying and authenticating an electronic device 201 in a communication network by using the SIM 224. The cellular module 221 is capable of performing at least a part of the functions provided by the processor 210. The cellular module 221 may include a CP.

Each of the Wi-Fi module 223, the BT module 225, the GPS module 227, and the NFC module 228 may include a processor for processing data transmitted or received through the corresponding module. At least part of the cellular module 221, Wi-Fi module 223, BT module 225, GPS module 227, and NFC module 228 (e.g., two or more modules) may be included in one integrated chip (IC) or one IC package.

The RF module 229 is capable of transmission/reception of communication signals, e.g., RF signals. The RF module 229 is capable of including a transceiver, a power amplifier module (PAM), a frequency filter, a low noise amplifier (LNA), an antenna, etc. At least one of the cellular module 221, the Wi-Fi module 223, the BT module 225, the GPS module 227, and the NFC module 228 is capable of transmission/reception of RF signals through a separate RF module.

The memory 230 may include a built-in memory 232 or an external memory 234. The built-in memory 232 is capable of including at least one of a volatile memory, e.g., a dynamic random access memory (DRAM), a static RAM (SRAM), a synchronous dynamic RAM (SDRAM), etc. and a non-volatile memory, e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, an NOR flash memory, etc.), a hard drive, a solid state drive (SSD), etc.

The external memory 234 may include a flash drive, e.g., a compact flash (CF), a secure digital (SD), a micro secure digital (Micro-SD), a mini secure digital (Mini-SD), an extreme digital (xD), a multi-media card (MMC), a memory stick, etc. The external memory 234 may be connected to the electronic device 201, functionally and/or physically, through various interfaces.

The sensor module 240 is capable of measuring/detecting a physical quantity or an operation state of the electronic device 201, and converting the measured or detected information into an electronic signal. The sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green and blue (RGB) sensor), a biometric sensor 240I, a temperature/humidity sensor 240J, an illuminance sensor 240K, and a ultraviolet (UV) sensor 240M. Additionally or alternatively, the sensor module 240 may also include an e-nose sensor, an electromyography (EMG) sensor, an electroencephalogram (EEG) sensor, an electrocardiogram (ECG) sensor, an infrared (IR) sensor, an iris sensor and/or a fingerprint sensor. The sensor module 240 may further include a control circuit for controlling one or more sensors included therein. The electronic device 201 may include a processor, configured as part of the processor 210 or a separate component, for controlling the sensor module 240. In this case, while the processor 210 is operating in sleep mode, the processor is capable of controlling the sensor module 240.

The input device 250 may include a touch panel 252, a (digital) pen sensor 254, a key 256, or an ultrasonic input unit 258. The touch panel 252 may be implemented with at least one of a capacitive touch system, a resistive touch system, an infrared touch system, and an ultrasonic touch system. The touch panel 252 may further include a control circuit, and the touch panel 252 may include a tactile layer to provide a tactile response to the user. The (digital) pen sensor 254 may be implemented with a part of the touch panel or with a separate recognition sheet. The key 256 may include a physical button, an optical key, or a keypad. The ultrasonic input unit 258 is capable of detecting ultrasonic waves, created in an input tool, through a microphone 288, and identifying data corresponding to the detected ultrasonic waves.

The display 260 may include a panel 262, a hologram unit 264, or a projector 266. The panel 262 may include the same or similar components as the display 160 shown in FIG. 1. The panel 262 may be implemented to be flexible, transparent, or wearable. The panel 262 may also be incorporated into one module together with the touch panel 252. The hologram unit 264 is capable of showing a stereoscopic image in the air by using light interference. The projector 266 is capable of displaying an image by projecting light onto a screen. The screen may be located inside or outside of the electronic device 201. The display 260 may further include a control circuit for controlling the panel 262, the hologram unit 264, or the projector 266.

The interface 270 may include an HDMI 272, a USB 274, an optical interface 276, or a d-subminiature (D-sub) 278.

The interface 270 may be included in the communication interface 170 shown in FIG. 1. Additionally or alternatively, the interface 270 may include a mobile high-definition link (MHL) interface, a SD card/MMC interface, or an infrared data association (IrDA) standard interface.

The audio module 280 is capable of providing bidirectional conversion between a sound and an electronic signal. At least part of the components in the audio module 280 may be included in the input/output interface 150 shown in FIG. 1. The audio module 280 is capable of processing sound information input or output through a speaker 282, a receiver 284, earphones 286, a microphone 288, etc.

The camera module 291 is a device capable of taking both still and moving images. The camera module 291 may include one or more image sensors (e.g., a front image sensor or a rear image sensor), a lens, an image signal processor (ISP), a flash (e.g., an LED or xenon lamp), etc.

The power management module 295 is capable of managing power of the electronic device 201. The power management module 295 may include a power management integrated circuit (PMIC), a charger IC, or a battery gauge. The PMIC may employ wired charging and/or wireless charging methods. Examples of the wireless charging method are magnetic resonance charging, magnetic induction charging, and electromagnetic charging. To this end, the PMIC may further include an additional circuit for wireless charging, such as a coil loop, a resonance circuit, a rectifier, etc. The battery gauge is capable of measuring the residual capacity, charge in voltage, current, or temperature of the battery 296.

The battery 296 takes the form of either a rechargeable battery or a solar battery.

The indicator 297 is capable of displaying a specific status of the electronic device 201 or a part thereof (e.g., the processor 210), e.g., a boot-up status, a message status, a charging status, etc. The motor 298 is capable of converting an electrical signal into mechanical vibrations, such as, a vibration effect, a haptic effect, etc. The electronic device 201 may also include a processing unit (e.g., GPU) for supporting a mobile TV. The processing unit for supporting a mobile TV is capable of processing media data pursuant to standards, e.g., digital multimedia broadcasting (DMB), digital video broadcasting (DVB), or mediaFlo™, etc.

Figure 3:
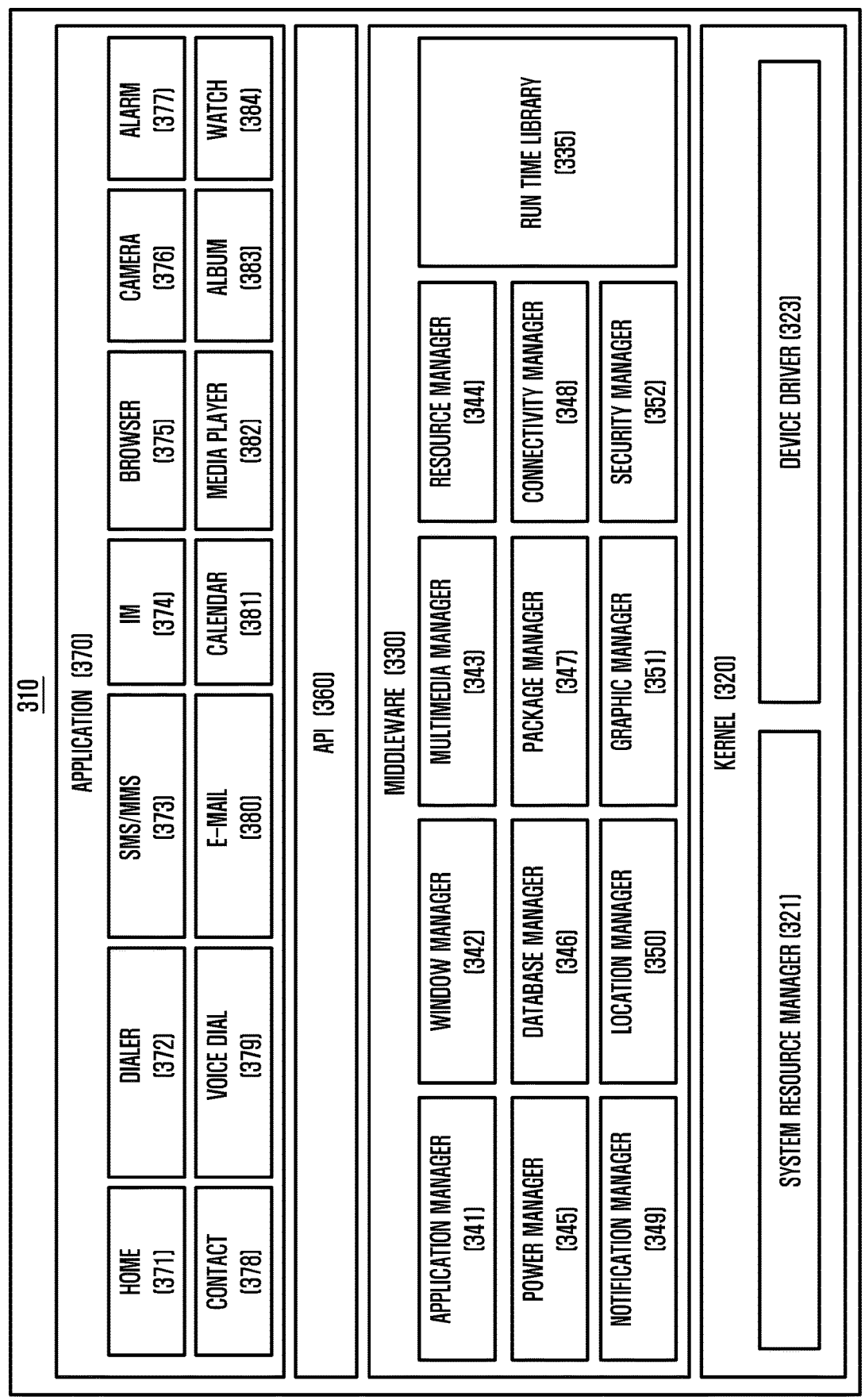
FIG. 3 is a block diagram illustrating a program module according to various embodiments of the present disclosure.

FIG. 3 is a block diagram of a programming module according to an embodiment of the present disclosure.

Referring to FIG. 3, a program module 310 (e.g., program module 140 shown in FIG. 1) is capable of including an OS for controlling resources related to the electronic device (e.g., electronic device 101) and/or various applications (e.g., application programs 147 shown in FIG. 1) running on the OS. The OS may be Android, iOS, Windows, Symbian, Tizen, Bada, etc.

The program module 310 is capable of including a kernel 320, middleware 330, an API 360 and/or applications 370. At least part of the program module 310 may be preloaded on the electronic device or downloaded from a server (e.g., an electronic device 102 or 104, server 106, etc.).

The kernel 320 (for example, kernel 141) may include a system resource manager 321 and/or a device driver 323. The system resource manager 321 may include, for example, a process manager, a memory manager, and a file system manager. The system resource manager 321 may perform a system resource control, allocation, and recall. The device driver 323 may include, for example, a display driver, a camera driver, a Bluetooth driver, a shared memory driver, a USB driver, a keypad driver, a Wi-Fi driver, and an audio driver. Further, according to an embodiment, the device driver 323 may include an Inter-Process Communication (IPC) driver.

The middleware 330 may provide a function utilized in common by the applications 370. Further, the middleware 330 may provide a function through the API 360 to allow the applications 370 to efficiently use limited system resources within the electronic device. According to an embodiment, the middleware 330 (for example, the middleware 143) may include at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, and a security manager 352. Furthermore, although not shown, the middleware 330 may also include a payment manager.

The runtime library 335 may include, for example, a library module used by a complier to add a new function through a programming language while the applications 370 are executed. According to an embodiment, the runtime library 335 executes input and output, management of a memory, a function associated with an arithmetic function and the like.

The application manager 341 may manage, for example, a life cycle of at least one of the applications 370. The window manager 342 may manage GUI resources used on the screen. The multimedia manager 343 may detect a format utilized for reproducing various media files and perform an encoding or a decoding of a media file by using a codec suitable for the corresponding format. The resource manager 344 manages resources such as a source code, a memory, or a storage space of at least one of the applications 370.

The power manager 345 may operate together with a basic input/output system (BIOS) to manage a battery or power and provides power information utilized for the operation. The database manager 346 may manage generation, search, and change of a database to be used by at least one of the applications 370. The package manager 347 may manage an installation or an update of an application distributed in a form of a package file.

The connection manager 348 may manage, for example, a wireless connection such as Wi-Fi or Bluetooth. The notification manager 349 may display or notify a user of an event such as an arrival message, an appointment, a proximity alarm or the like, in a manner that does not disturb the user. The location manager 350 may manage location information of the electronic device. The graphic manager 351 may manage a graphic effect provided to the user or a user interface related to the graphic effect. The security manager 352 provides a general security function utilized for a system security or a user authentication. According to an embodiment, when the electronic device (for example, the electronic device 101) has a call function, the middleware 330 may further include a telephony manager for managing a voice of the electronic device or a video call function.

The middleware 330 is capable of including modules configuring various combinations of functions of the above described components. The middleware 330 is capable of providing modules specialized according to types of operation systems to provide distinct functions. The middleware 330 may be adaptively configured in such a way as to remove part of the existing components or to include new components.

The API 360 (for example, API 145) may be a set of API programming functions, and may be provided with a different configuration according to an operating system. For example, in Android or iOS, a single API set may be provided for each platform. In Tizen, two or more API sets may be provided.

The applications 370 (e.g., application programs 147) may include one or more applications for performing various functions, e.g., home 371, dialer 372, short message service (SMS)/multi-media message service (MMS) 373, instant message (IM) 374, browser 375, camera 376, alarm 377, contact 378, voice dial 379, email 380, calendar 381, media player 382, album 383, and clock 384. Furthermore, although not shown, the applications 370 may also include health care (e.g., an application for measuring amount of exercise, blood sugar level, etc.), and environment information (e.g., an application for providing atmospheric pressure, humidity, temperature, etc.).

According to an embodiment, the applications 370 are capable of including an application for supporting information exchange between an electronic device (e.g., electronic device 101) and an external device (e.g., electronic devices 102 and 104), which is hereafter called 'information exchange application'). The information exchange application is capable of including a notification relay application for relaying specific information to external devices or a device management application for managing external devices.

According to an embodiment, the applications 370 are capable of including an application (e.g., a health care application of a mobile medical device, etc.) having specified attributes of an external device (e.g., electronic devices 102 and 104). According to an embodiment, the applications 370 are capable of including applications received from an external device (e.g., a server 106, electronic devices 102 and 104). According to an embodiment, the applications 370 are capable of including a preloaded application or third party applications that can be downloaded from a server. It should be understood that the components of the program module 310 may be called different names according to types of operating systems.

The term "module" according to the embodiments of the disclosure, means, but is not limited to, a unit of one of software, hardware, and firmware or any combination thereof. The term "module" may be used interchangeably with the terms "unit," "logic," "logical block," "component," or "circuit." The term "module" may denote a smallest unit of component or a part thereof. The term "module" may be the smallest unit of performing at least one function or a part thereof. A module may be implemented mechanically or electronically. For example, a module may include at least one of application-specific integrated circuit (ASIC) chip, field-programmable gate arrays (FPGAs), and Programmable-Logic Device known or to be developed for certain operations.

According to various embodiments of the present disclosure, the devices (e.g. modules or their functions) or methods may be implemented by computer program instructions stored in a computer-readable storage medium. In the case that the instructions are executed by at least one processor (e.g. processor 120), the at least one processor may execute the functions corresponding to the instructions. The computer-readable storage medium may be the memory 130. At least a part of the programming module may be implemented (e.g. executed) by the processor 120. At least a part of the programming module may include modules, programs, routines, sets of instructions, and processes for executing the at least one function.

According to various embodiments of the present disclosure, a method for controlling an electronic device may include operations of, at a processor (e.g. 440 in FIG. 4), displaying one or more graphic objects on a touch screen (e.g., 420 in FIG. 4); at the processor, identifying attribute information of at least one graphic object associated with a fingerprint sensor (e.g., 410 in FIG. 4) among the one or more graphic objects; at the processor, determining an activated area of the fingerprint sensor for the at least one graphic object, based on the attribute information; and at the processor, acquiring fingerprint information through the activated area.

According to various embodiments, the operation of determining an activated area may include, at the processor, determining the activated area, further based on other attribute information associated with a user input acquired through the touch screen.

According to various embodiments, the operation of determining the activated area may include, at the processor, identifying, as at least part of the other attribute information, coordinate or size information about the user input, and extending the activated area, based on the coordinate or size information.

According to various embodiments, the operation of determining the activated area may include, at the processor, identifying, as at least part of the other attribute information, pressure information about the user input, and reducing the activated area to a region defined by the pressure information.

According to various embodiments, the operation of determining an activated area may include, at the processor, determining the activated area, further based on other attribute information associated with registered fingerprint information.

According to various embodiments, the method may further include operations of, at the processor, controlling the activated area in a first sensing mode; and at the processor, controlling a remaining area other than the activated area in a second sensing mode.

According to various embodiments, the processor may acquire the fingerprint information through the activated area using the first sensing mode, and acquire user input information through the remaining area using the second sensing mode.

According to various embodiments, the at least one fingerprint sensor may include a first fingerprint sensor (e.g., 411 in FIG. 5) and a second fingerprint sensor (e.g., 412 in FIG. 5), and the operation of determining an activated area may include, at the processor, selecting one of the first and second fingerprint sensors, the selected fingerprint sensor corresponding to the activated area.

According to various embodiments, the method may further include an operation of, at the processor, ignoring information acquired from a remaining area other than the activated area.

According to various embodiments, the method may further include an operation of, at the processor, selecting, as the at least one graphic object, a graphic object for receiving a user input associated with security authentication from among the one or more graphic objects.

The computer-readable storage medium includes magnetic media such as a floppy disk and a magnetic tape, optical media including a compact disc (CD) ROM and a DVD ROM, a magneto-optical media such as a floptical disk, and the hardware device designed for storing and executing program commands such as ROM, RAM, and flash memory. The program commands include the language code executable by computers using the interpreter as well as the machine language codes created by a compiler. The aforementioned hardware device can be implemented with one or more software modules for executing the operations of the various embodiments of the present disclosure.

The module or programming module of the present disclosure may include at least one of the aforementioned components with omission of some components or addition of other components. The operations of the modules, programming modules, or other components may be executed in series, in parallel, recursively, or heuristically. Also, some operations may be executed in different order, omitted, or extended with other operations.

According to various embodiments of the present disclosure, a non-transitory computer-readable recording medium has, recorded thereon, a program executing operations of an electronic device including a touch screen (e.g., 420 in FIG. 4) and at least one fingerprint sensor (e.g., 410 in FIG. 4) formed on at least a part of the touch screen. The operations may include displaying one or more graphic objects on the touch screen; identifying attribute information of at least one graphic object associated with the fingerprint sensor among the one or more graphic objects; determining an activated area of the fingerprint sensor for the at least one graphic object, based on the attribute information; and acquiring fingerprint information through the activated area.

Figure 4:
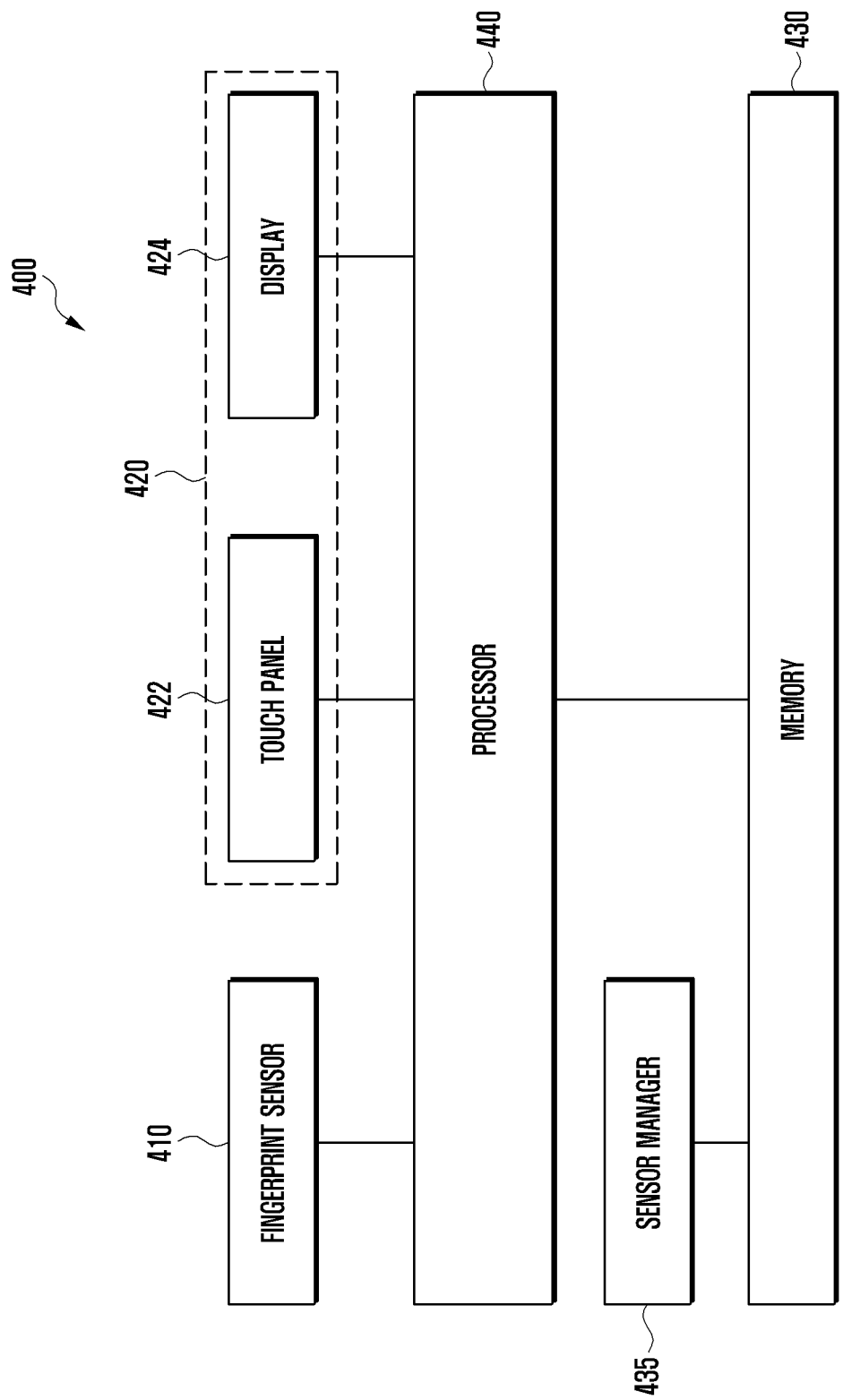
FIG. 4 is a block diagram illustrating an internal configuration of an electronic device according to various embodiments of the present disclosure.

FIG. 4 is a block diagram illustrating an internal configuration of an electronic device according to various embodiments of the present disclosure.

Referring to FIG. 4, the electronic device 400 may include all or part of the electronic device 101 shown in FIG. 1 or the electronic device 201 shown in FIG. 2, for example.

The electronic device 400 (e.g., the above-mentioned electronic device 101, 102, or 201) according to various embodiments of the present disclosure may include a fingerprint sensor 410 (e.g., the biometric sensor 240I), a touch screen 420, a memory 430 (e.g., the above-mentioned memory 130 or 230), a sensor manager 435, and a processor 440 (e.g., the above-discussed processor 120 or 210).

The fingerprint sensor 410 may acquire fingerprint information of the user of the electronic device 400. The fingerprint sensor 410 may be disposed to cover the entire area or a partial area of the touch screen 420. The fingerprint sensor 410 may be one or more (e.g., 1, 2, . . . , n). The fingerprint sensor 410 may detect fingerprint information in a first sensing mode (i.e., a fingerprint sensing mode) and also detect touch information in a second sensing mode (i.e., a touch sensing mode). The fingerprint information obtained through the fingerprint sensor 410 may be in the form of image or features and may be used for authentication of the electronic device 400 by being compared with fingerprint information previously stored in the memory 430.

According to one embodiment, the fingerprint sensor 410 may provide at least one fingerprint sensing scheme. For example, the fingerprint sensor 410 may generate fingerprint information corresponding to a user's fingerprint, based on the amount of current varying when a user's finger touches at least a portion of a predetermined fingerprint sensing area. The fingerprint sensing area of the fingerprint sensor 410 may be defined in a home button of the electronic device 400 or in the entire or partial area of the touch screen 420. The fingerprint sensor 410 may be formed of a fingerprint sensing array having a plurality of sensing regions.

According to various embodiments, the fingerprint sensor 410 may have various types such as an optical type, a capacitive type, and an ultrasonic type. The fingerprint sensor of optical type may acquire fingerprint information by capturing a fingerprint image through a photosensitive diode. The fingerprint sensor of capacitive type may acquire fingerprint information by using the principle that ridges of a fingerprint touched to an electrode are detected and non-touched grooves between ridges are not detected. The fingerprint sensor of ultrasonic type may acquire fingerprint information by generating ultrasonic waves through a piezoelectric device and using a path difference of the ultrasonic waves respectively reflected on the ridges and grooves of the fingerprint.

The touch screen 420 may display at least one user interface (UI) object. The touch screen 420 may include the fingerprint sensing area of the fingerprint sensor 410 in the entire or partial area of a touch panel 422 (e.g., the touch panel 252 in FIG. 2) or a display 424 (e.g., the display 260 in FIG. 2). For example, the fingerprint sensing area of the fingerprint sensor 410 may be formed by printing or etching on a surface of a cover glass provided over the display 424 to protect the display 424. In another example, the fingerprint sensing area of the fingerprint sensor 410 may be formed on an upper or lower surface of the touch panel 422. In still another example, the fingerprint sensing area of the fingerprint sensor 410 may be formed in pixels of the touch panel 422 or in a black masking region between the pixels.

According to various embodiments, the touch screen 420 may perform an input function and a display function. For this, the touch screen 420 may include the touch panel 422 and the display 424. The touch panel 422 may be formed of a touch sensor of capacitive overlay type, resistive overlay type, or infrared beam type, or formed of a pressure sensor. In addition to the above type sensors, any other type sensor capable of sensing the contact or pressure of an object may be used for the touch panel 422. The touch panel 422 may sense a user's touch input, generates a sensing signal, and transmit the sensing signal to the processor 440. The sensing signal may include coordinate data of the touch input. When the touch input has a touch and drag form, the touch panel 422 may generate sensing signals including coordinate data of a drag path and transmit the signals to the processor 440. The display 424 may be formed of a liquid crystal display (LCD), an organic light emitting diode (OLED), an active matrix OLED (AMOLED), or the like. The display 424 may visually offer a menu of the electronic device 400, input data, function setting information, and any other information to the user.

The memory 430 may store fingerprint information of the user of the electronic device 400. The memory 430 may also store resources about various objects associated with the fingerprint sensor 410. The resources about the objects may be loaded into a framework and displayed on the display 424. The memory 430 may store various programs and data related to a fingerprint recognition function or a fingerprint touch function, based on the fingerprint sensor 410 or the touch panel 422 of the electronic device 400. For example, the memory 430 may store a certain program for processing a function of the fingerprint sensor 410 to acquire fingerprint information through at least one scanning scheme, and data processed according to the program. In addition, the memory 430 may previously store user fingerprint information to be used for comparison with fingerprint information recognized through the fingerprint sensor 410.

According to various embodiments, the memory 430 may store a program for processing instructions of the processor 440, an operating system (OS), various applications, and input/output data, and also store a program for controlling the whole operation of the electronic device 400. The memory 430 may store a user interface (UI) provided in the electronic device 400 and various kinds of setting information utilized for performing functions in the electronic device 400.

The sensor manager 435 which is a kind of program may be stored in the memory 430. For example, the sensor manager 435 may be included in the middleware 330 of the program module shown in FIG. 3.

According to various embodiments, the sensor manager 435 may provide instructions to activate, as a fingerprint-sensing activated area (also referred to as a fingerprint acquisition area), a particular area defined by certain height and width values from the coordinates of a certain reference point (e.g., an upper left point of a specific UI object) in the entire area of the fingerprint sensor 410. In addition, the sensor manager 435 may provide instructions to determine, as the fingerprint-sensing activated area, a particular area defined by certain height and width values from the coordinates of a certain reference point in the entire area of the fingerprint sensor 410 and also to ignore a touch scan image obtained from a touch area other than the fingerprint-sensing activated area. In addition, the sensor manager 435 may provide instructions to activate, as the fingerprint-sensing activated area, a rectangular area defined by the coordinates of a first point (e.g., an upper left point of a specific UI object) and a second point (e.g., a lower right point of the UI object) in the entire area of the fingerprint sensor 410. In addition, the sensor manager 435 may provide instructions to activate, as the fingerprint-sensing activated area, the fingerprint sensing area of at least one of a plurality of fingerprint sensors (e.g., four fingerprint sensors 411 to 414 in FIG. 12), based on coordinate information of a specific UI object.

According to one embodiment, the sensor manager 435 may provide instructions to activate the fingerprint sensing area, and the processor 440 may perform a particular function corresponding to the instructions provided by the sensor manager 435.

The processor 440 may control functions and operations of the fingerprint sensor 410, the touch screen 420, the memory 430, and the sensor manager 435 in the electronic device 400. The processor 440 may also execute applications stored in the memory 430. For example, such applications may include a payment application, a security application, a login-utilized application, and any other application that offers a UI related to the fingerprint recognition function.

According to one embodiment, the processor 440 may display one or more graphic objects on the touch screen 420 and identify attribute information (e.g., coordinate information, size information) of at least one graphic object associated with the fingerprint sensor 410 among the one or more graphic objects. Also, the processor 440 may determine an activated area of the fingerprint sensor 410 for the at least one graphic object, based on the attribute information, and acquire fingerprint information through the activated area. According to one embodiment, the processor 440 may determine the activated area, further based on other attribute information (e.g., touch information) associated with a user input acquired through the touch screen 420.

According to one embodiment, the processor 440 may identify, as at least part of the other attribute information, coordinate or size information about the user input, and extend the activated area, based on the coordinate or size information.

According to one embodiment, the processor 440 may identify, as at least part of the other attribute information, pressure information about the user input, and to reduce the activated area to a region defined by the pressure information.

According to one embodiment, the processor 440 may determine the activated area, further based on other attribute information associated with the registered fingerprint information stored in the memory 430.

According to one embodiment, the processor 440 may control the activated area in the first sensing mode (e.g., a fingerprint sensing mode), and control a remaining area other than the activated area in the second sensing mode (e.g., a touch sensing mode).

According to one embodiment, the processor 440 may acquire the fingerprint information through the activated area using the first sensing mode, and acquire user input information through the remaining area using the second sensing mode.

According to one embodiment, when the fingerprint sensor 410 includes a first fingerprint sensor and a second fingerprint sensor, the processor 440 may select one of the first and second fingerprint sensors such that the selected fingerprint sensor corresponds to the activated area.

According to one embodiment, the processor 440 may select, as the at least one graphic object, a graphic object for receiving a user input associated with security authentication from among the one or more graphic objects.

According to various embodiments, the processor 440 may control the overall operation of the electronic device 400, control a signal flow between internal elements of the electronic device 400, and process data. The processor 440 may be implemented by, for example, a central processing unit (CPU), an application processor, and a communication processor. In addition, the processor 440 may be formed of a single core processor or a multi-core processor, and may be implemented as a plurality of processors.

Figure 5:
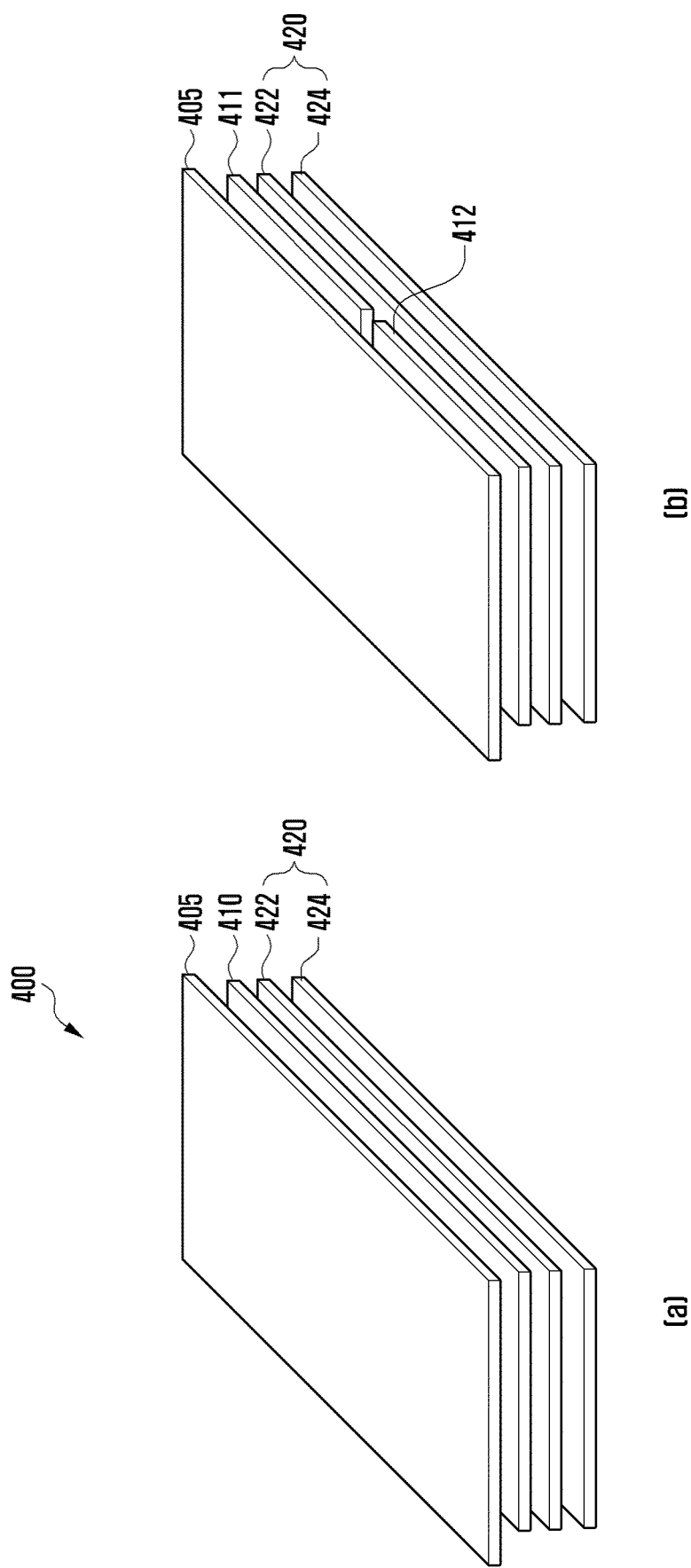
FIG. 5 is a diagram illustrating an electronic device having a fingerprint sensor according to various embodiments of the present disclosure.

FIG. 5 is a diagram illustrating an electronic device having a fingerprint sensor according to various embodiments of the present disclosure. Specifically, part (a) of FIG. 5 shows an example where one fingerprint sensor is included in the electronic device, and part (b) of FIG. 5 shows an example where two fingerprint sensors are included in the electronic device.

As shown in FIG. 5, the electronic device 400 according to various embodiments of the present disclosure may include a cover window 405, at least one fingerprint sensor 410, and a touch screen 420 implemented using a touch panel 422 and a display 424.

In FIG. 5, the vertically upwards direction in the drawing corresponds to orientation towards the front face of the electronic device 400, and the vertically downwards direction in the drawing corresponds to orientation towards the rear face of the electronic device 400. The cover window 405, the at least one fingerprint sensor 410, and the touch screen 420 including the touch panel 422 and the display 424 may be sequentially disposed in a housing (not shown) of the electronic device 400. It is understood that the disposition order of the fingerprint sensor 410 and the touch screen 420 may be altered or changed from what is shown.

The cover window 405 may be disposed on the front face of the electronic device 400 to protecting the fingerprint sensor 410 and the touch screen 420 from external impact. The cover window 405 may be formed of a transparent material. Therefore, the cover window 405 may transmit light generated inside the electronic device 400 to the outside, and may also transmit light incident from the outside to the inside of the electronic device 400.

In the electronic device 400 as shown in part (a) of FIG. 5, one fingerprint sensor 410 may be disposed to cover the entire area of the touch screen 420. Alternatively, although one fingerprint sensor 410 covers a portion of the touch screen 420, it is possible to implement functions according to embodiments of the present disclosure.

In the electronic device 400 as shown in part (a) of FIG. 5, the one fingerprint sensor 410 and the touch screen 420 may be disposed under the cover window 405. The cover window 405 and the fingerprint sensor 410 may be adhered to each other through an optically clear adhesive (OCA). Similarly, the fingerprint sensor 410 and the touch screen 420 may adhere to one other through the OCA.

In the electronic device 400 as shown in part (b) of FIG. 5, both a first fingerprint sensor 411 and a second fingerprint sensor 412 may be disposed covering the entire area of the touch screen 420. The first and second fingerprint sensors 411 and 412 may be disposed side by side on a same plane along a same plane (e.g., a horizontal plane). Alternatively, in embodiments where both the first and second fingerprint sensors 411 and 412 cover a portion of the touch screen 420 rather than an entirety, it is possible to implement functions according to embodiments of the present disclosure.

In the electronic device 400 as shown in part (b) of FIG. 5, the first and second fingerprint sensors 411 and 412 and the touch screen 420 may be disposed under the cover window 405. The first and second fingerprint sensors 411 and 412 may adhere to the cover window 405 and to the touch screen 420 through the OCA.

Figure 6:
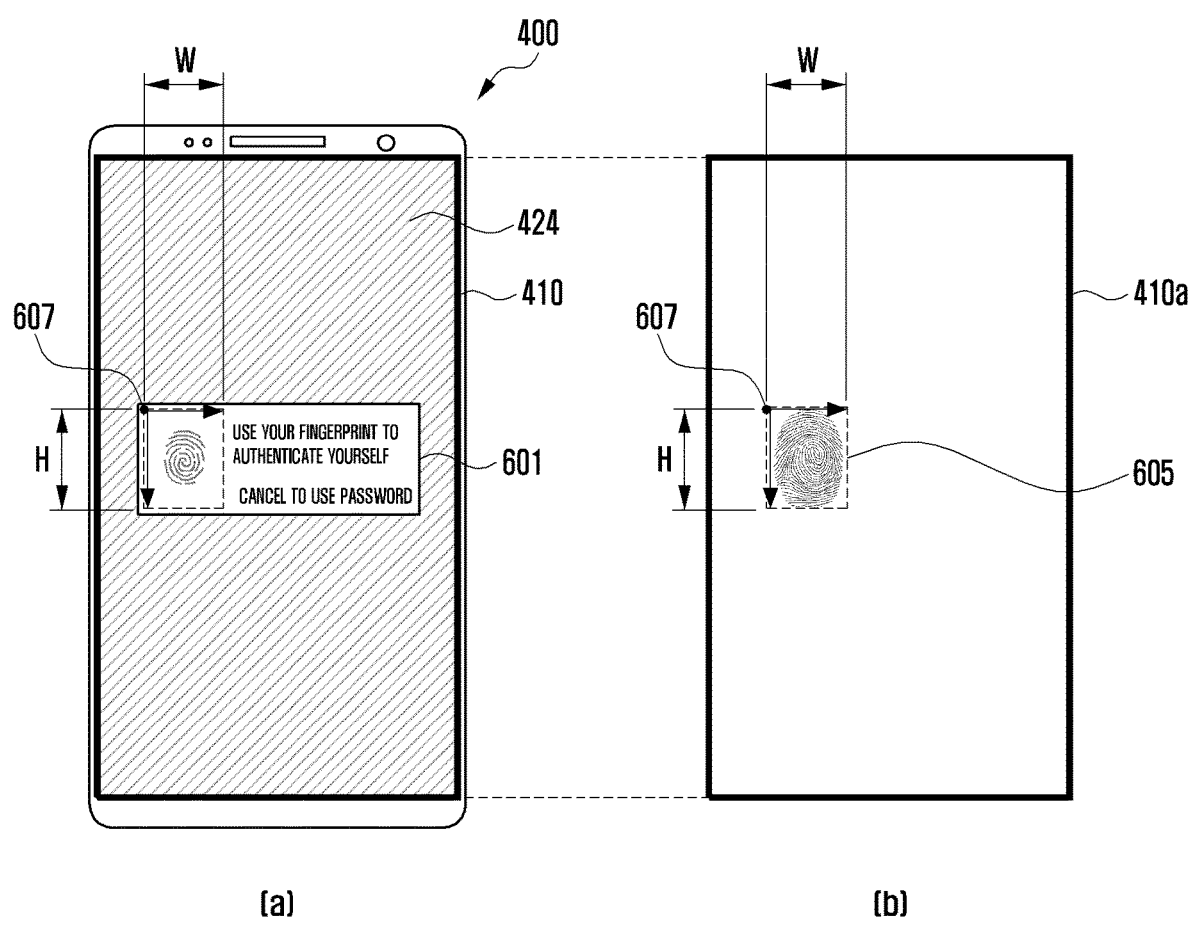
FIG. 6 is a diagram illustrating an example of activating a fingerprint sensing area in an electronic device having one fingerprint sensor according to various embodiments of the present disclosure.

FIG. 6 is a diagram illustrating an example of activating a fingerprint sensing area in an electronic device having one fingerprint sensor according to various embodiments of the present disclosure.

As shown in parts (a) and (b) of FIG. 6, the electronic device 400 according to various embodiments of the present disclosure may include one fingerprint sensor 410 that covers the entire area or a partial area of the display 424. In the fingerprint sensing area 410a of the display 424, a certain user interface (UI) object 601 related to a fingerprint recognition function may be displayed. Information about the fingerprint sensing area 410a, which in this example covers the entire or partial area of the display 424, may be mapped on a one-to-one basis to region information of the display 424. In particular, a fingerprint-sensing activated area 605 of the fingerprint sensor 410 may be determined on the basis of the coordinate information of the UI object 601. In this disclosure, the fingerprint-sensing activated area 605 of the fingerprint sensor 410 may also be referred to as a fingerprint acquisition area which indicates a particular region for acquiring fingerprint information.

According to one embodiment, the fingerprint recognition application of the electronic device 400 may send the coordinates of a certain reference point (e.g., an upper left point 607) in the UI object 601 and the height and width values (H and W) of fingerprint information to the processor 440. Then, the processor 440 may activate, as the fingerprint-sensing activated area 605, a particular area defined by the height and width values (H and W) from the coordinates of the reference point 607 within the fingerprint sensing area 410a.

Figure 7:
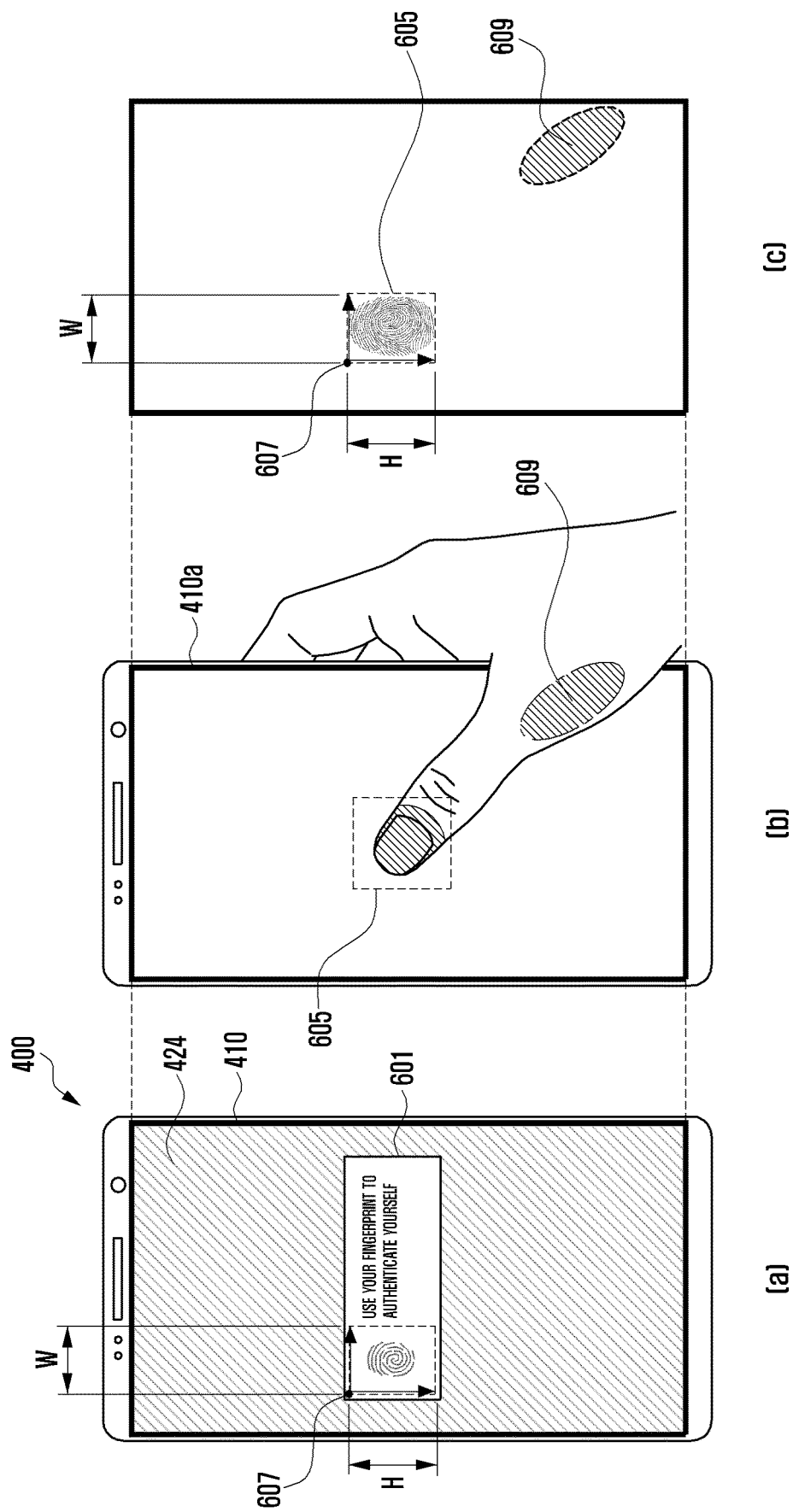
FIG. 7 is a diagram illustrating another example of activating a fingerprint sensing area in an electronic device having one fingerprint sensor according to various embodiments of the present disclosure.

FIG. 7 is a diagram illustrating another example of activating a fingerprint sensing area in an electronic device having one fingerprint sensor according to various embodiments of the present disclosure.

As shown in parts (a) to (c) of FIG. 7, the electronic device 400 according to various embodiments of the present disclosure may include one fingerprint sensor 410 that covers the entire area or a partial area of the display 424. In the fingerprint sensing area 410a of the display 424, the UI object 601 related to the fingerprint recognition function may be displayed. Information about the fingerprint sensing area 410a covering the entire or partial area of the display 424 may be mapped on a one-to-one basis to region information of the display 424. In particular, the fingerprint-sensing activated area 605 of the fingerprint sensor 410 may be determined on the basis of the coordinate information of the UI object 601. As mentioned above, the fingerprint-sensing activated area 605 of the fingerprint sensor 410 may also be referred to as a fingerprint acquisition area. Any touch contact 609 acquired from a touch area other than the fingerprint-sensing activated area 605 may be ignored.

According to one embodiment, the fingerprint recognition application of the electronic device 400 may transmit, to the processor 440, information about the fingerprint-sensing activated area 605 including the coordinates of a certain reference point (e.g., an upper left point 607) in the UI object 601 and the height and width values (H and W) of fingerprint information, and any touch information obtained from the touch area other than the fingerprint-sensing activated area 605. Then, the processor 440 may determine the fingerprint-sensing activated area 605 on the basis of the received information. Also the processor 440 may acquire a user's fingerprint information through the fingerprint-sensing activated area 605, and ignore other touch contacts, such as the contact 609 generated by the touch information obtained in a touch area different than the fingerprint-sensing activated area 605. Then, the processor 440 may perform a matching operation between the acquired fingerprint information and fingerprint information stored in the memory 430 for the purposes of authentication.

Figure 8:
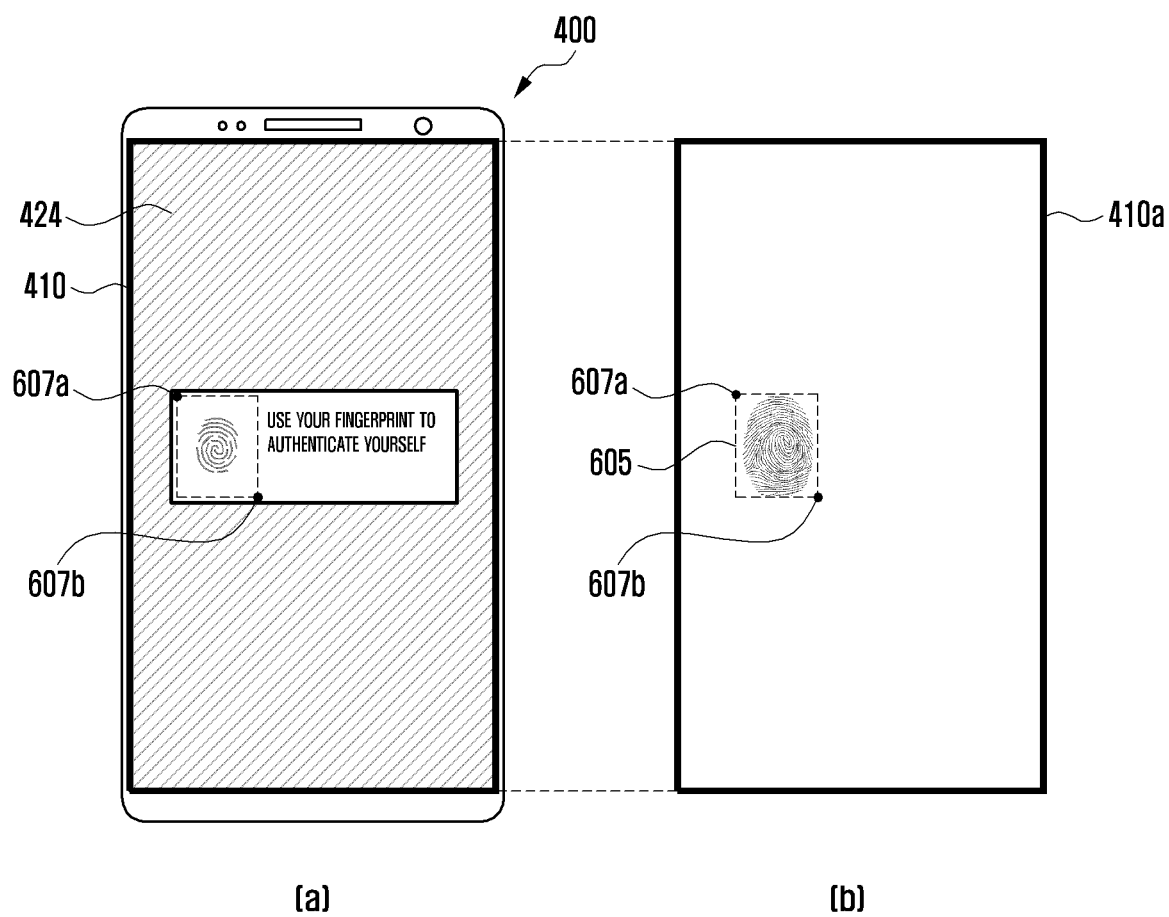
FIG. 8 is a diagram illustrating still another example of activating a fingerprint sensing area in an electronic device having one fingerprint sensor according to various embodiments of the present disclosure.

FIG. 8 is a diagram illustrating still another example of activating a fingerprint sensing area in an electronic device having one fingerprint sensor according to various embodiments of the present disclosure.

As shown in parts (a) and (b) of FIG. 8, the electronic device 400 according to various embodiments of the present disclosure may include one fingerprint sensor 410 that covers the entire area or a partial area of the display 424. In the fingerprint sensing area 410a of the display 424, the UI object 601 related to the fingerprint recognition function may be displayed. Information about the fingerprint sensing area 410a covering the entire or partial area of the display 424 may be mapped on a one-to-one basis to region information of the display 424. In particular, the fingerprint-sensing activated area 605 of the fingerprint sensor 410 may be determined on the basis of the coordinates of a first point (e.g., an upper left point 607a) and a second point (e.g., a lower right point 607b) in the UI object 601. The fingerprint-sensing activated area 605 of the fingerprint sensor 410 may also be referred to as a fingerprint acquisition area.

According to one embodiment, the fingerprint recognition application of the electronic device 400 may transmit the coordinates of the first and second points 607a and 607b in the UI object 601 to the processor 440. Then, the processor 440 may activate, as the fingerprint-sensing activated area 605, a rectangular area defined by the coordinates of the first and second points 607a and 607b within the fingerprint sensing area 410a.

Figure 9:
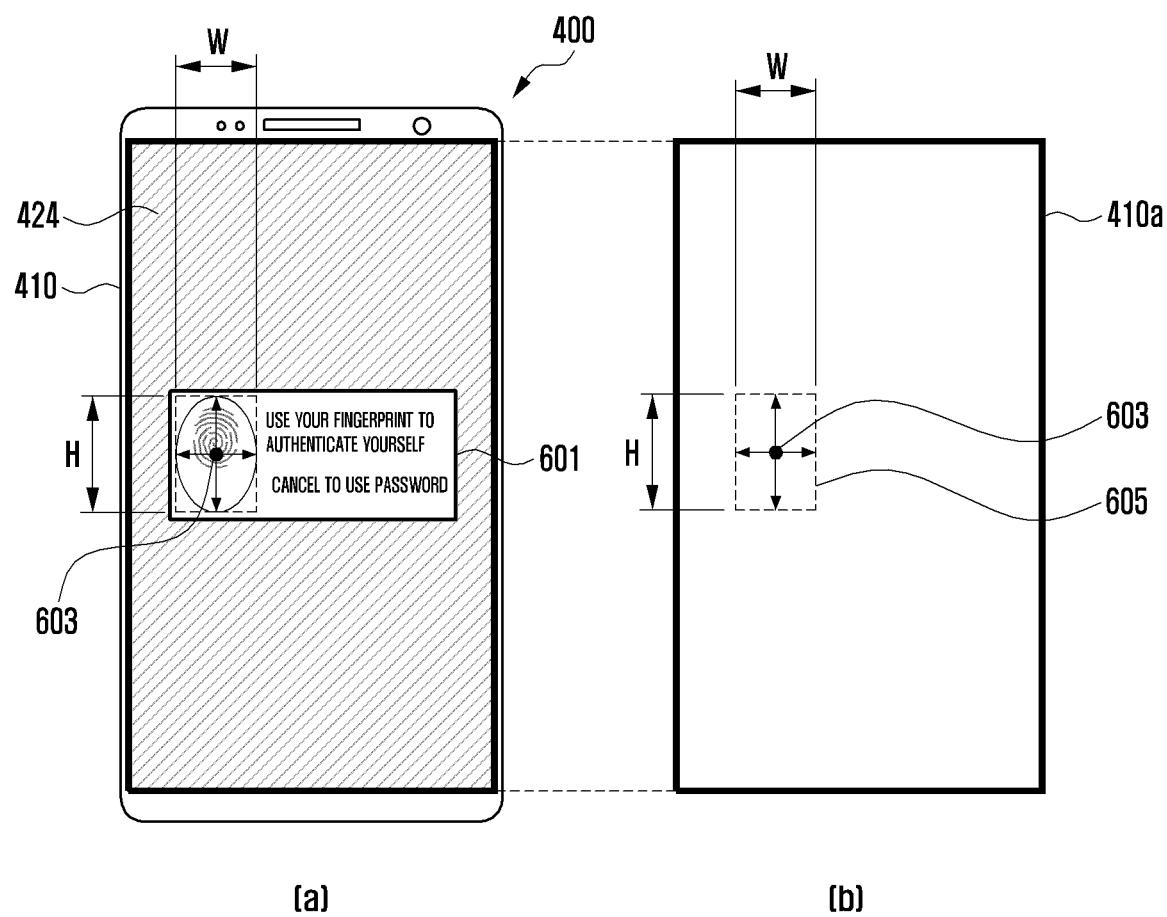
FIG. 9 is a diagram illustrating yet another example of activating a fingerprint sensing area in an electronic device having one fingerprint sensor according to various embodiments of the present disclosure.

FIG. 9 is a diagram illustrating yet another example of activating a fingerprint sensing area in an electronic device having one fingerprint sensor according to various embodiments of the present disclosure.

As shown in parts (a) and (b) of FIG. 9, the electronic device 400 according to various embodiments of the present disclosure may include one fingerprint sensor 410 that covers the entire area or a partial area of the display 424. In the fingerprint sensing area 410a of the display 424, the UI object 601 related to the fingerprint recognition function may be displayed. Information about the fingerprint sensing area 410a covering the entire or partial area of the display 424 may be mapped on a one-to-one basis to region information of the display 424. In particular, the fingerprint-sensing activated area 605 of the fingerprint sensor 410 may be determined on the basis of the coordinate information 603 of a touch input on the UI object 601. The fingerprint-sensing activated area 605 of the fingerprint sensor 410 may also be referred to as a fingerprint acquisition area.

According to one embodiment, the fingerprint recognition application of the electronic device 400 may transmit the coordinates of the touch input (e.g., a central point 603 of the touch input) in the UI object 601 and the related height and width values (H and W) to the processor 440. Then, the processor 440 may activate, as the fingerprint-sensing activated area 605, a rectangular area defined by the height and width values (H and W) from the touch input coordinates 603 within the fingerprint sensing area 410a.

Figure 10:
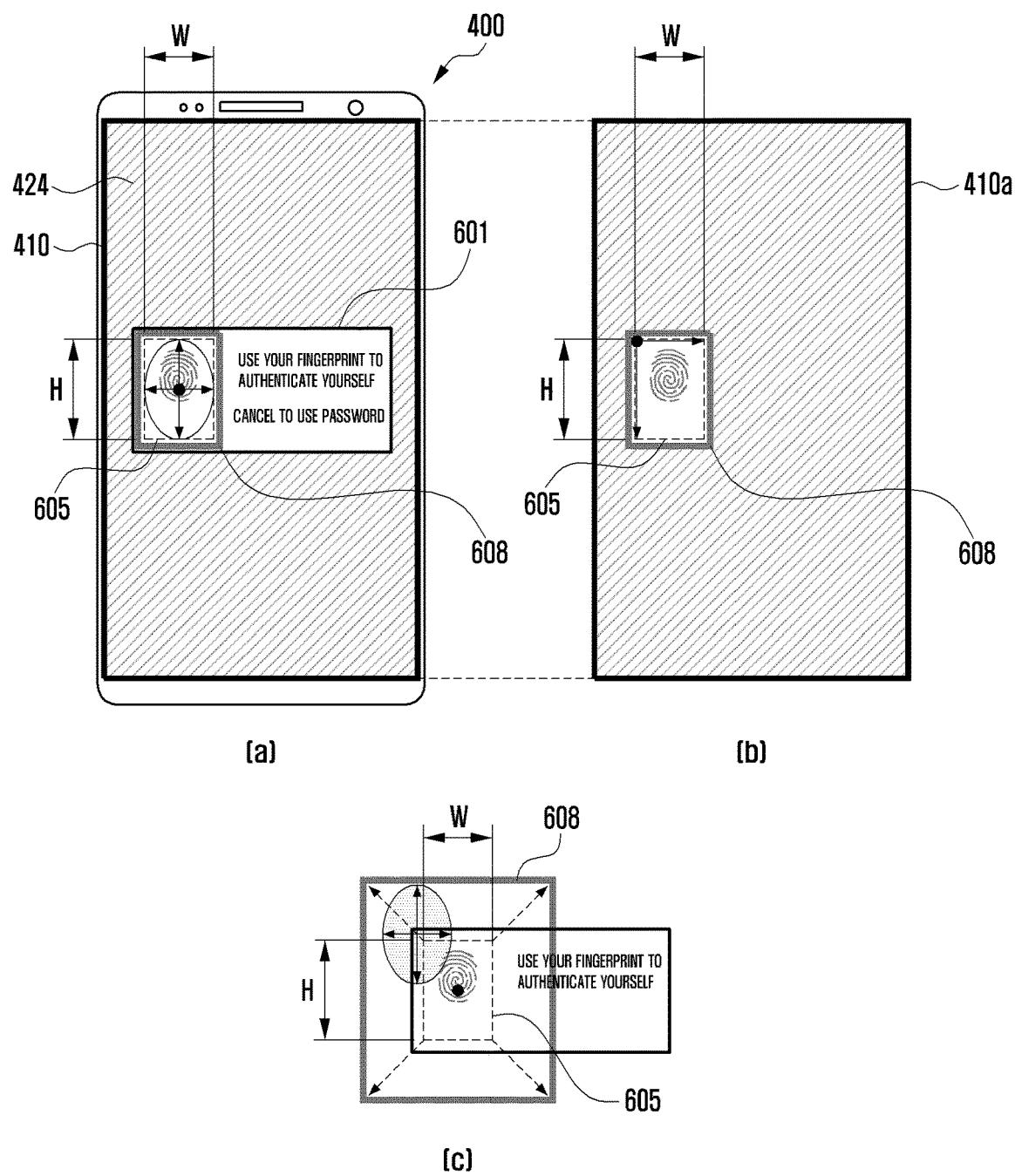
FIG. 10 is a diagram illustrating yet another example of activating a fingerprint sensing area in an electronic device having one fingerprint sensor according to various embodiments of the present disclosure.

FIG. 10 is a diagram illustrating yet another example of activating a fingerprint sensing area in an electronic device having one fingerprint sensor according to various embodiments of the present disclosure.

As shown in parts (a) to (c) of FIG. 10, the electronic device 400 according to various embodiments of the present disclosure may include one fingerprint sensor 410 that covers the entire area or a partial area of the display 424. In the fingerprint sensing area 410a of the display 424, the UI object 601 related to the fingerprint recognition function may be displayed. Information about the fingerprint sensing area 410a covering the entire or partial area of the display 424 may be mapped on a one-to-one basis to region information of the display 424. In particular, the fingerprint-sensing activated area 605 of the fingerprint sensor 410 may be determined on the basis of the coordinate information in the UI object 601 (e.g., the coordinates of the reference point 607 as shown in FIG. 7, the coordinates of the first and second points 607a and 607b as shown in FIG. 8, or the coordinates of the touch input 603 as shown in FIG. 9) and further extended by a margin area 608.

According to one embodiment, the processor 440 may determine the margin area 608, based on user touch information. For example, the processor 440 may determine a margin area 608 that is larger than a user touch area of the UI object 601, based on the coordinate information of the user touch area. Also, the processor 440 may identify the length of a major axis (e.g., height H) and the length of a minor axis (e.g., width W) from the user touch information, and determine the margin area 608 to be larger than an area defined by the lengths of major and minor axes.

Figure 11:
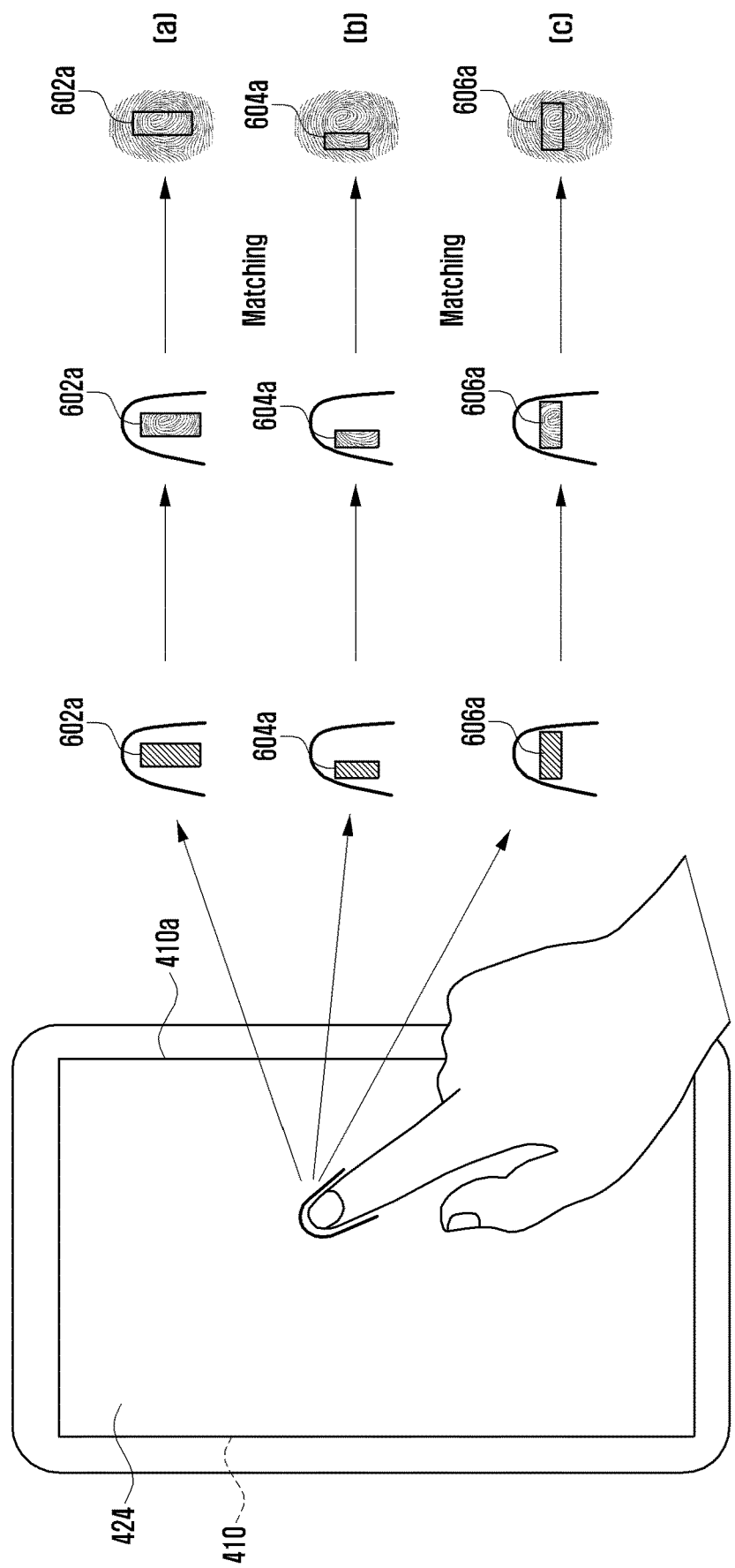
FIG. 11 is a diagram illustrating an example of setting a portion with high accuracy as an activated area of a fingerprint sensor in an electronic device having one fingerprint sensor according to various embodiments of the present disclosure.

FIG. 11 is a diagram illustrating an example of setting a portion with high accuracy as an activated area of a fingerprint sensor in an electronic device having one fingerprint sensor according to various embodiments of the present disclosure.

As shown in FIG. 11, the electronic device 400 according to various embodiments of the present disclosure may include one fingerprint sensor 410 that covers the entire or partial area of the display 424. Also, information about the fingerprint sensing area 410a covering the entire or partial area of the display 424 may be mapped on a one-to-one basis to region information of the display 424.

Specifically, as shown in parts (a) to (c) of FIG. 11, when user authentication is utilized for payment, secure application access, unlocking, or any other secure data-based transaction, etc., the electronic device 400 according to various embodiments of the present disclosure may determine, as the activated area within the fingerprint sensing area 410a, a portion that allows accurate recognition of the user fingerprint information (or biometric information), based on a particular attribute information (e.g., a touch position, a touch size, a touch acceleration, or a touch pressure) of a user input.

For example, in the example of part (a) of FIG. 11, when a part of the user's body (e.g., a tip of the index finger) touches a portion of the fingerprint sensing area 410a of the display 424, the processor 440 of the electronic device 400 may determine, based on attribute information (e.g., touch information) of the user input, that a certain quantity of pressure (e.g., a threshold level of pressure) is distributed to a lengthwise central region 602a of the part of the user's body contacting the display. Accordingly, the processor 440 may select the lengthwise central region 602a as the 'activated' area for recognizing fingerprint information and acquire the fingerprint information.

In another example of part (b) of FIG. 11, when a part of the user's body (e.g., a tip of the index finger) touches a portion of the fingerprint sensing area 410a of the display 424, the processor 440 of the electronic device 400 may determine, based on attribute information of the user input, that a certain quantity of pressure is distributed to a left region 604a of the touching part of the user's body. Accordingly, the processor 440 may select the left region 604a as the activated area for recognizing fingerprint information and acquire the fingerprint information.

In still another example shown in part (c) of FIG. 11, when a part of the user's body (e.g., a tip of the index finger) touches a portion of the fingerprint sensing area 410a of the display 424, the processor 440 of the electronic device 400 may determine, based on attribute information of the user input, that a certain quantity of pressure is distributed to a widthwise central region 606a of the touching part of the user's body. Then, the processor 440 may select the widthwise central region 606a as the activated area for recognizing fingerprint information and acquire the fingerprint information.

According to one embodiment, the processor 440 of the electronic device 400 may perform user authentication by comparing the fingerprint information obtained through the selected activated area (e.g., 602a, 604a and 606a shown in parts (a) to (c) of FIG. 11) with user information stored in the memory 430. For example, the processor 440 of the electronic device 400 may previously store a relative position of the selected activated area (e.g., 602a, 604a and 606a) with respect to a touching object (e.g., the user's index finger) in the memory 430, and optionally compare the fingerprint information acquired from the activated area (e.g., 602a, 604a and 606a) with the stored fingerprint information, thereby shortening the time utilized for user authentication.

According to various embodiments, the processor 440 of the electronic device 400 may determine the activated area for acquiring fingerprint information (or biometric information), based on attribute information (e.g., a touch position, a touch size, a touch acceleration, or a touch pressure) of a user input. In addition, the processor 440 of the electronic device 400 may select a fingerprint recognition algorithm corresponding to the attribute of the fingerprint sensing area (e.g., shape or size) and use the selected algorithm for user authentication. For example, the processor 440 of the electronic device 400 may select and use a first algorithm for user authentication if the fingerprint sensing area has a first shape, and similarly select and use a second algorithm for user authentication if the fingerprint sensing area has a second shape.

Figure 12:
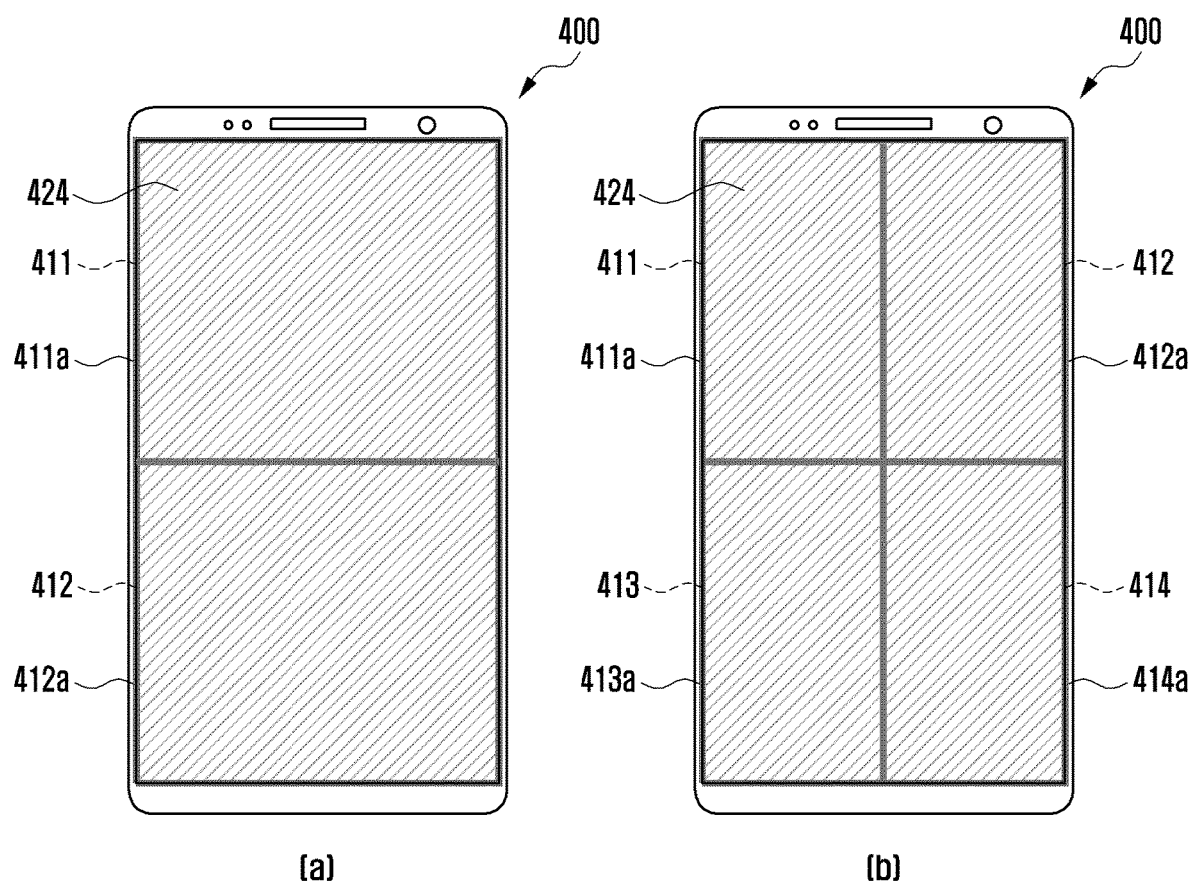
FIG. 12 is a diagram illustrating a fingerprint sensing area of an electronic device having a plurality of fingerprint sensors according to various embodiments of the present disclosure.

FIG. 12 is a diagram illustrating a fingerprint sensing area of an electronic device having a plurality of fingerprint sensors according to various embodiments of the present disclosure.

As shown in part (a) of FIG. 12, the electronic device 400 according to various embodiments of the present disclosure may include a first fingerprint sensor 411 and a second fingerprint sensor 412 both of which cover the entire area of the display 424 having a first zone (e.g., an upper zone) and a second zone (e.g., a lower zone). The first and second fingerprint sensors 411 and 412 may be disposed side by side on the same plane in the first direction (e.g., the horizontal direction). The first fingerprint sensor 411 may form a first fingerprint sensing area 411a, and the second fingerprint sensor 412 may form a second fingerprint sensing area 412a.

As shown in part (b) of FIG. 12, the electronic device 400 according to various embodiments of the present disclosure may include a first fingerprint sensor 411, a second fingerprint sensor 412, a third fingerprint sensor 413, and a fourth fingerprint sensor 414 all of which cover the entire area of the display 424 having a first zone (e.g., an upper left zone), a second zone (e.g., an upper right zone), a third zone (e.g., a lower left zone), and a fourth zone (e.g., a lower right zone). The first to fourth fingerprint sensors 411 to 414 may be disposed side by side on the same plane in the first direction (e.g., the horizontal direction). The first fingerprint sensor 411 may form a first fingerprint sensing area 411a, and the second fingerprint sensor 412 may form a second fingerprint sensing area 412a. Similarly, the third fingerprint sensor 413 may form a third fingerprint sensing area 413a, and the fourth fingerprint sensor 414 may form a fourth fingerprint sensing area 414a.

Figure 13:
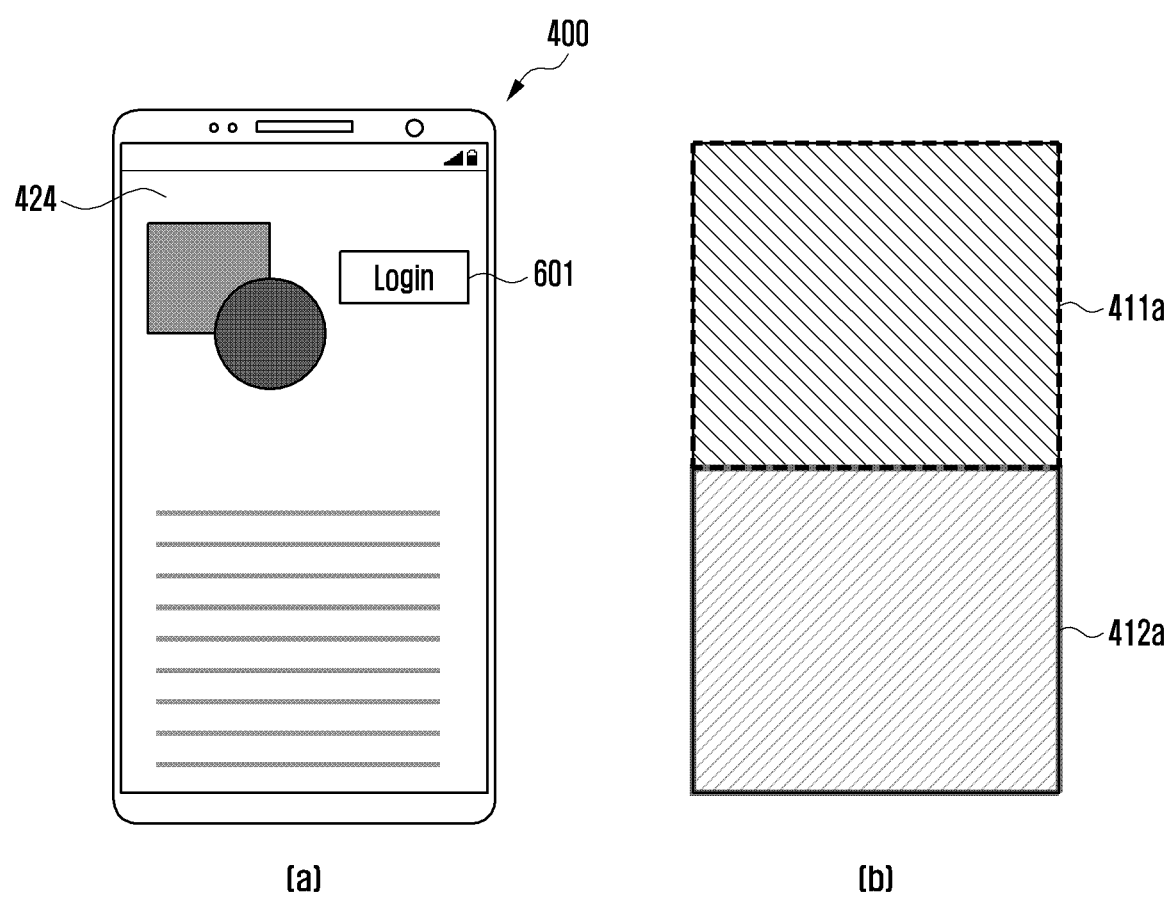
FIG. 13 is a diagram illustrating an example of activating a fingerprint sensing area in an electronic device having two fingerprint sensors according to various embodiments of the present disclosure.

FIG. 13 is a diagram illustrating an example of activating a fingerprint sensing area in an electronic device having two fingerprint sensors according to various embodiments of the present disclosure.

As shown in FIG. 13, the electronic device 400 according to various embodiments of the present disclosure may include the first fingerprint sensing area 411a and the second fingerprint sensing area 412a.

As shown in part (a) of FIG. 13, when the fingerprint recognition application of the electronic device 400 executes the fingerprint recognition function, the processor 440 may display an UI object 601 (e.g., a login icon) related to the fingerprint recognition function on the display 424. When the user touches the UI object 601, the coordinate information corresponding to the user touch may be transmitted to the processor 440. Then, based on the coordinate information, the processor 440 may control the first fingerprint sensing area 411a to be activated as the fingerprint-sensing activated area as shown in part (b) of FIG. 13, and acquire the user fingerprint information through the activated area.

Figure 14:
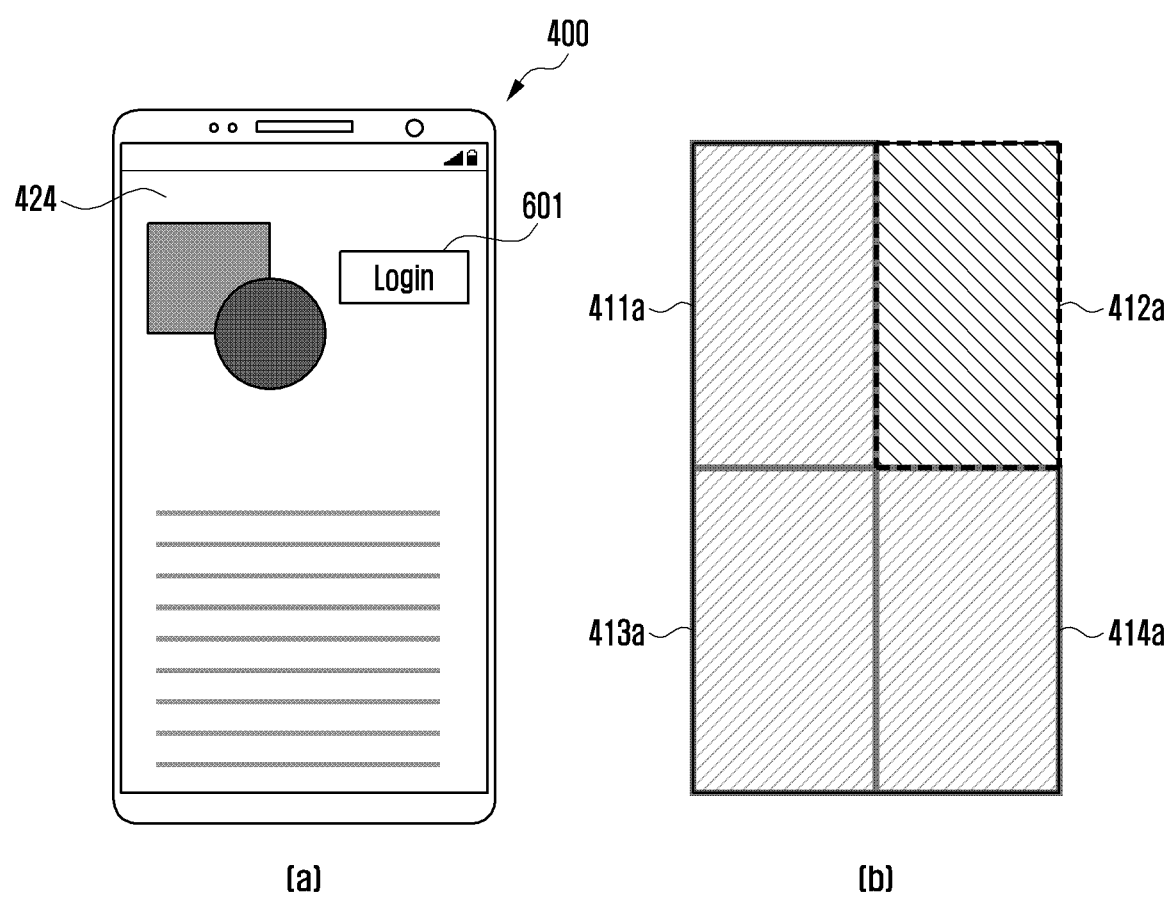
FIG. 14 is a diagram illustrating an example of activating a fingerprint sensing area in an electronic device having four fingerprint sensors according to various embodiments of the present disclosure.

FIG. 14 is a diagram illustrating an example of activating a fingerprint sensing area in an electronic device having four fingerprint sensors according to various embodiments of the present disclosure.

As shown in FIG. 14, the electronic device 400 according to various embodiments of the present disclosure may include the first fingerprint sensing area 411a, the second fingerprint sensing area 412a, the third fingerprint sensing area 413a, and the fourth fingerprint sensing area 414a.

As shown in part (a) of FIG. 14, when the fingerprint recognition application of the electronic device 400 executes the fingerprint recognition function, the processor 440 may display the UI object 601 (e.g., a login icon) related to the fingerprint recognition function on the display 424. When the user touches the UI object 601, the coordinate information corresponding to the user touch may be sent to the processor 440. Then, based on the coordinate information, the processor 440 may control the second fingerprint sensing area 412a to be activated, as shown in part (b) of FIG. 14, and acquire the user fingerprint information through the activated area 412a.

Figure 15:
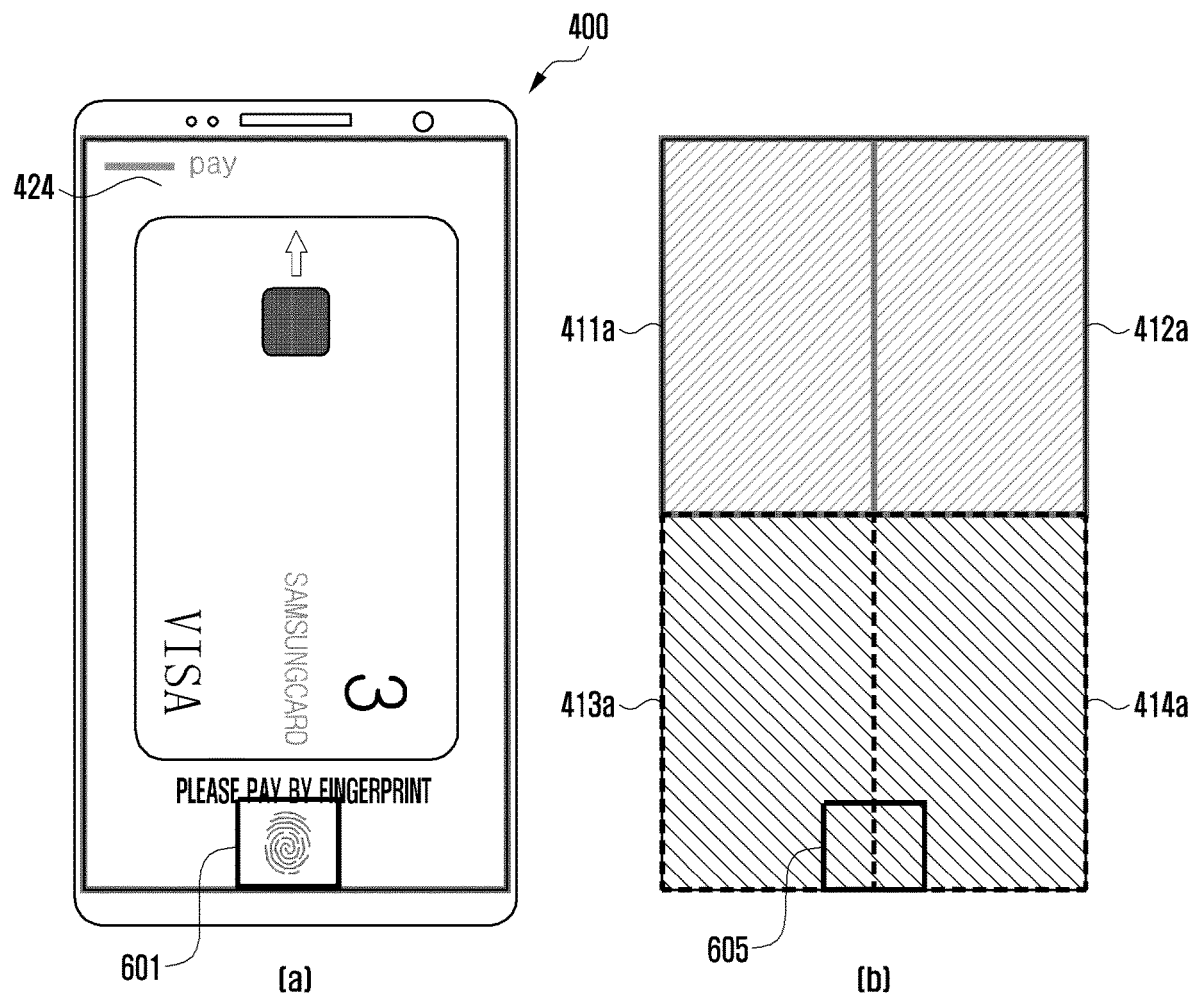
FIG. 15 is a diagram illustrating an example of activating two fingerprint sensing areas in an electronic device having four fingerprint sensors according to various embodiments of the present disclosure.

FIG. 15 is a diagram illustrating an example of activating two fingerprint sensing areas in an electronic device having four fingerprint sensors according to various embodiments of the present disclosure.

As shown in FIG. 15, the electronic device 400 according to various embodiments of the present disclosure may include the first fingerprint sensing area 411a, the second fingerprint sensing area 412a, the third fingerprint sensing area 413a, and the fourth fingerprint sensing area 414a.

As shown in part (a) of FIG. 15, when the fingerprint recognition application of the electronic device 400 executes the fingerprint recognition function, the processor 440 may display the UI object 601 (e.g., a fingerprint-like icon) related to the fingerprint recognition function at a lower center position of the display 424. The lower center position may be formed of parts of the third and fourth fingerprint sensing areas 413a and 414a. When the user touches the UI object 601, the coordinate information corresponding to the user touch may be sent to the processor 440. Then, based on the coordinate information, the processor 440 may determine the fingerprint sensing area to be activated.

According to one embodiment, as shown in part (a) of FIG. 15, the UI object 601 for fingerprint recognition may be displayed at the lower center position of the display 424. When the user touches the UI object 601, the processor 440 may control the third and fourth fingerprint sensing areas 413a and 414a to be activated as shown in part (b) of FIG. 15, based on the coordinate information of the user touch. In addition, the processor 440 may receive fingerprint images through the third and fourth fingerprint sensing areas 413a and 414a and then combine the received fingerprint images to acquire the user fingerprint information. FIG. 16 is a diagram illustrating an example of partly activating a fingerprint sensing area in an electronic device having at least one fingerprint sensor disposed partially in a display according to various embodiments of the present disclosure.

As shown in FIG. 16, the electronic device 400 according to various embodiments of the present disclosure may define the first and second fingerprint sensing areas 411a and 412a at some portions of the display 424 (e.g., upper and lower portions). Alternatively, the electronic device 400 according to various embodiments of the present disclosure may define one fingerprint sensing area 410a at the center of the display 424.

As shown in part (a) of FIG. 14, when the fingerprint recognition application of the electronic device 400 executes the fingerprint recognition function, the processor 440 may display the UI object 601 (e.g., a login icon) related to the fingerprint recognition function at an upper portion of the display 424. When the user touches the UI object 601, the coordinate information corresponding to the user touch may be transmitted to the processor 440. Then, based on the coordinate information, the processor 440 may determine the fingerprint sensing area to be activated.

According to one embodiment, as shown in part (a) of FIG. 16, the UI object 601 for fingerprint recognition may be displayed at an upper portion of the display 424. When the user touches the UI object 601, the processor 440 may control the first fingerprint sensing area 411a to be activated as the fingerprint-sensing activated area as shown in part (b) of FIG. 16, based on the coordinate information of the user touch. Then, the processor 440 may acquire the user fingerprint information through the activated area 411a.

Alternatively, When the UI object 601 touched by the user is disposed at the center of the display 424, the processor 440 may control the one fingerprint sensing area 410a to be activated as shown in part (c) of FIG. 16, based on the coordinate information of the user touch. Then, the processor 440 may acquire the user fingerprint information through the activated area 410a.

FIG. 17 is a diagram illustrating a method for performing touch acquisition and fingerprint acquisition through different scan frequencies in an electronic device according to various embodiments of the present disclosure.

According to one embodiment, when the electronic device 400 according to various embodiments of the present disclosure is capable of acquiring both touch information and fingerprint information, the processor 440 may change a scan frequency of the fingerprint-sensing activated area for acquiring the user fingerprint information.

For example, when acquiring the touch information by using the touch panel 422 as shown in part (a) of FIG. 17, the electronic device 400 may scan the user touch information through the first scan frequency.

In another example, when acquiring the fingerprint information by using the fingerprint sensor 410 as shown in part (b) of FIG. 17, the electronic device 400 may scan the user fingerprint information through the second scan frequency which is different from the first scan frequency. According to some embodiments, the second scan frequency may be higher than the first scan frequency.

In still another example, as shown in part (c) of FIG. 17, the electronic device 400 may acquire the user fingerprint information from a portion of the fingerprint sensor 410 using the second scan frequency.

According to various embodiments, when the user grips the electronic device 400, the processor 440 of the electronic device 400 may detect a user's grip state and determine the fingerprint sensing area based on the detected grip state. For example, if the user grips the electronic device 400 with one hand, the electronic device 400 may operate in a one-hand mode and suitably adjust the position of the fingerprint sensing area to accommodate the one-handed grip.

Figure 18A:
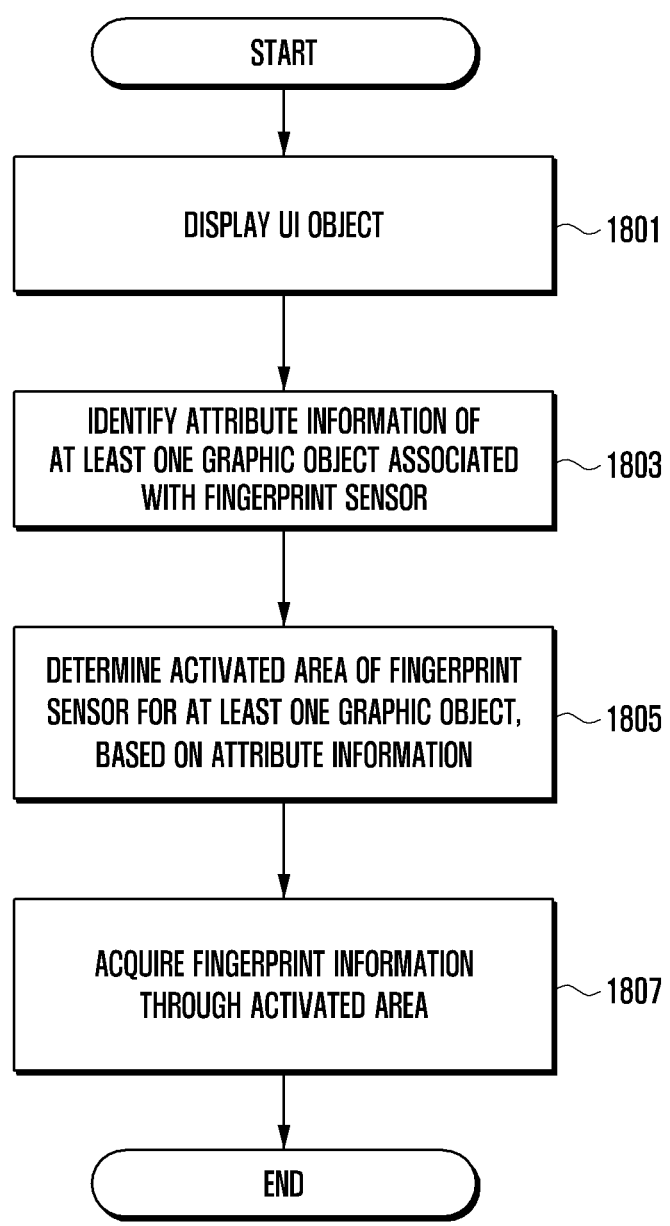
FIG. 18A is a flow diagram illustrating an example of a fingerprint sensor control method of an electronic device according to various embodiments of the present disclosure.

FIG. 18A is a flow diagram illustrating an example of a fingerprint sensor control method of an electronic device according to various embodiments of the present disclosure.

At operation 1801, the processor 440 may display one or more graphic objects (e.g., the UI object 601 in FIG. 6) on the touch screen 420.

At operation 1803, the processor 440 may identify attribute information of at least one graphic object associated with the fingerprint sensor 410, from among the one or more graphic objects displayed on the touch screen 420.

According to various embodiments, the attribute information may include at least one of coordinate information of the graphic object and size information of the graphic object (e.g., horizontal length and/or vertical length of the graphic object).

At operation 1805, the processor 440 may determine area of the fingerprint sensor 410 to activate for the at least one graphic object, based the identified attribute information.

At operation 1807, once the area is activated, the processor 440 may acquire user fingerprint information through the determined activated area (e.g., 605 in FIG. 6).

Figure 18B:
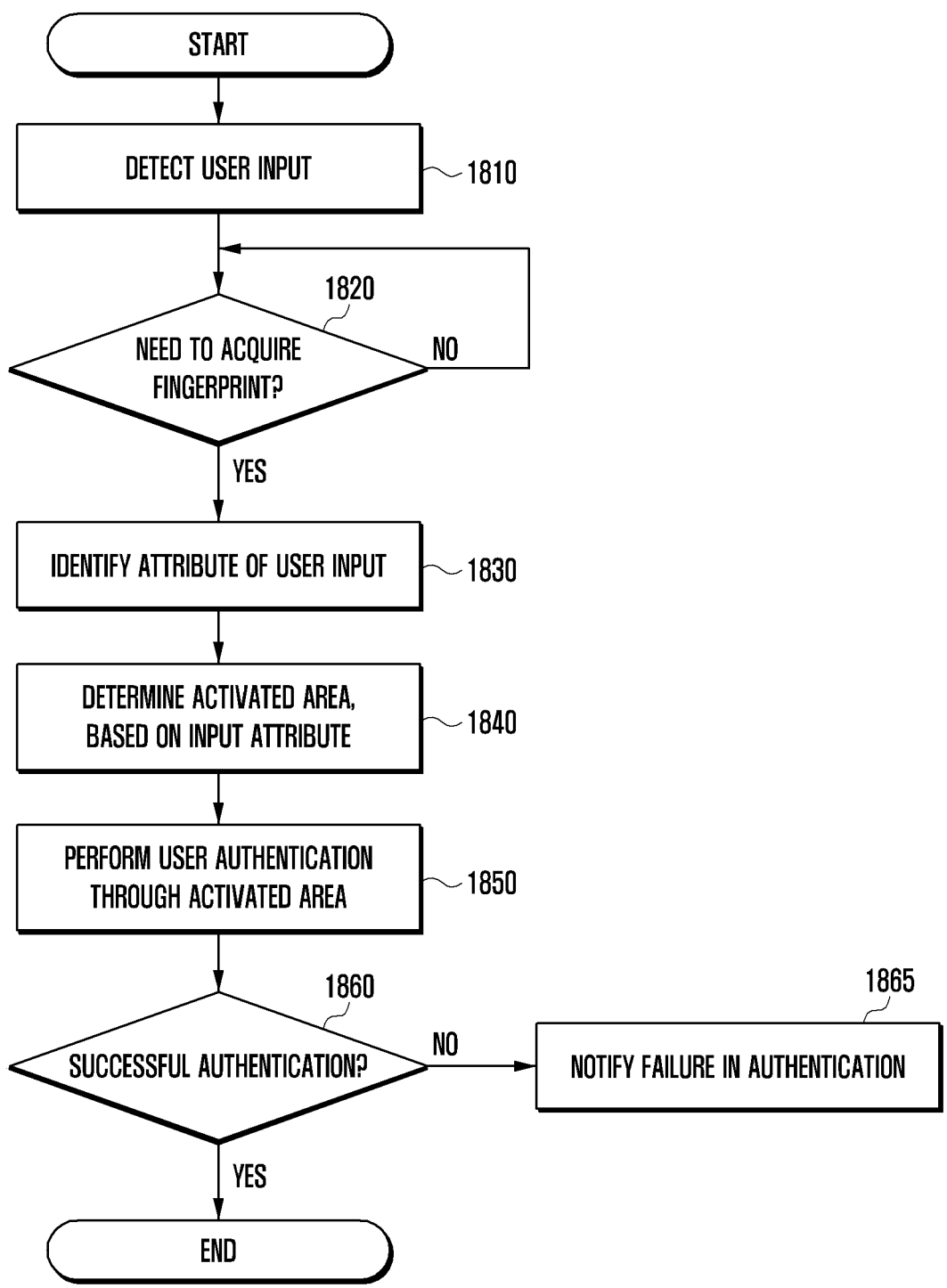
FIG. 18B is a flow diagram illustrating another example of a fingerprint sensor control method of an electronic device according to various embodiments of the present disclosure.

FIG. 18B is a flow diagram illustrating another example of a fingerprint sensor control method of an electronic device according to various embodiments of the present disclosure. At operation 1810, the electronic device 400 may detect a user's input (e.g., a touch) through the fingerprint sensor 410 or the touch screen 420.

At operation 1820, the processor 440 of the electronic device 400 may determine whether the acquisition of fingerprint information (or biometric information) is requested.

For example, based on contextual information (e.g., the location of the electronic device 400 such as the vicinity of a POS terminal), information about an application (e.g., a payment application is detected as presently active) currently executed in the electronic device 400, or information about a web site or page (e.g., Internet shopping mall) currently accessed by the electronic device 400, the processor 440 may determine whether the user touches the fingerprint sensor 410 or the touch screen 420 or wishes to enter a fingerprint (or biometric data) for a secure authentication, related to executing secure transmissions such as financial transaction or the like. That is, it is determined if there is a present need to conduct fingerprint-based authentication.

If it is determined that the acquisition of fingerprint information (or biometric information) is utilized, the processor 440 may identify attribute information of the user input at operation 1830.

For example, the attribute information of the user input may include at least one of a touch position, a touch range, a touch speed, a touch strength, and a touch pressure on the fingerprint sensor 410 or the touch screen 420.

At operation 1840, based on the identified attribute information of the user input, the processor 440 may determine at least part of a region of the user input as a fingerprint-sensing activated area (also referred to as a 'fingerprint acquisition area' or a 'recognition region'). As discussed above, the fingerprint-sensing activated area may be implemented using various shapes and sizes.

At operation 1850, the processor 440 may acquire the fingerprint information from the user input through the fingerprint-sensing activated area, and then perform user authentication based on the acquired fingerprint information.

At operation 1860, the processor 440 may determine whether the user authentication is successful.

If the user authentication fails, the processor 440 may notify the user of the failure in authentication in various manners (e.g., visual, auditory, tactile, or olfactory manner) at operation 1865.

Figure 19:
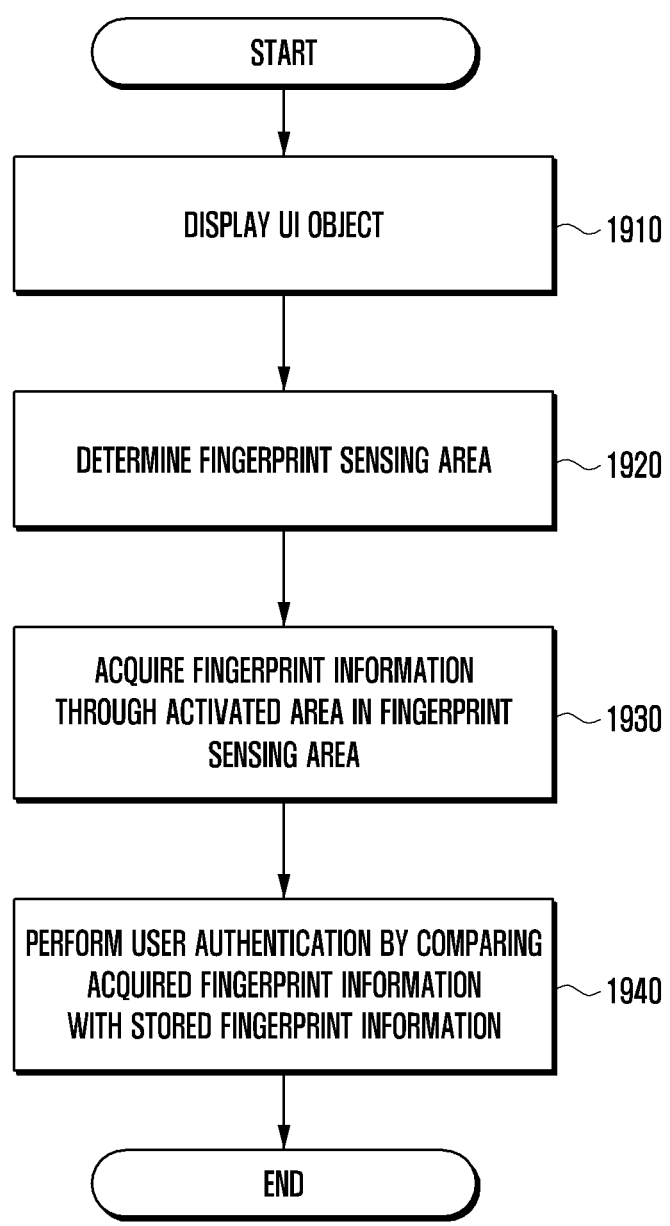
FIG. 19 is a flow diagram illustrating an example of a method for acquiring fingerprint information based on a user interface (UI) object in an electronic device according to various embodiments of the present disclosure.

FIG. 19 is a flow diagram illustrating an example of a method for acquiring fingerprint information based on a user interface (UI) object in an electronic device according to various embodiments of the present disclosure.

At operation 1910, the processor 440 may display, on the touch screen 420, a UI object (e.g., 601 in FIG. 6) for fingerprint authentication. At this time, the processor 440 may drive the fingerprint sensor 410 to be in a standby state capable of receiving a user's fingerprint input.

At operation 1920, the processor 440 may determine a fingerprint sensing area (or range) of the fingerprint sensor 410 capable of sensing a user's fingerprint.

According to one embodiment, the coordinate information for determining the fingerprint sensing area of the fingerprint sensor 410 may be implemented in various ways as described above with reference to FIGS. 6 to 8. For example, when a command related to fingerprint sensing is called at the application layer of the electronic device 400, the processor 440 may deliver coordinate information and size information of the UI object to the sensor manager to determine the fingerprint sensing area. In addition, at the application framework layer of the electronic device 400, the processor 440 may deliver coordinate information and size information of the UI object being currently displayed for receiving an input for fingerprint sensing to the sensor manager 445 to determine the fingerprint sensing area.

At operation 1930, the processor 440 may acquire user fingerprint information through the fingerprint-sensing activated area (e.g., 605 in FIG. 6) corresponding to the coordinate information and size information of the UI object in the fingerprint sensing area.

According to one embodiment, the processor 440 may acquire the user fingerprint information through the fingerprint-sensing activated area which is a part of the fingerprint sensing area received from the application layer or the application framework layer.

At operation 1940, the processor 440 may perform user authentication by comparing the user fingerprint information acquired through the fingerprint-sensing activated area with the fingerprint information stored in the memory 430.

According to one embodiment, an application programming interface (API) for the electronic device 400 to determine the fingerprint sensing area based on the UI object may be designed as shown in Table 1.

TABLE 1 static int MinFingerprintWidthArea = Minimum width to receive;
static int MinFingerprintHeightArea = Minimum length to receive;
booleanstartX, int startY, int width, int height) {
  if(widht < MinFingerprintWidthArea && height < MinFingerprintHeightArea) {
return false;
}
  Set a fingerprint sensor driver 2356 with received parameter values
}

Figure 20:
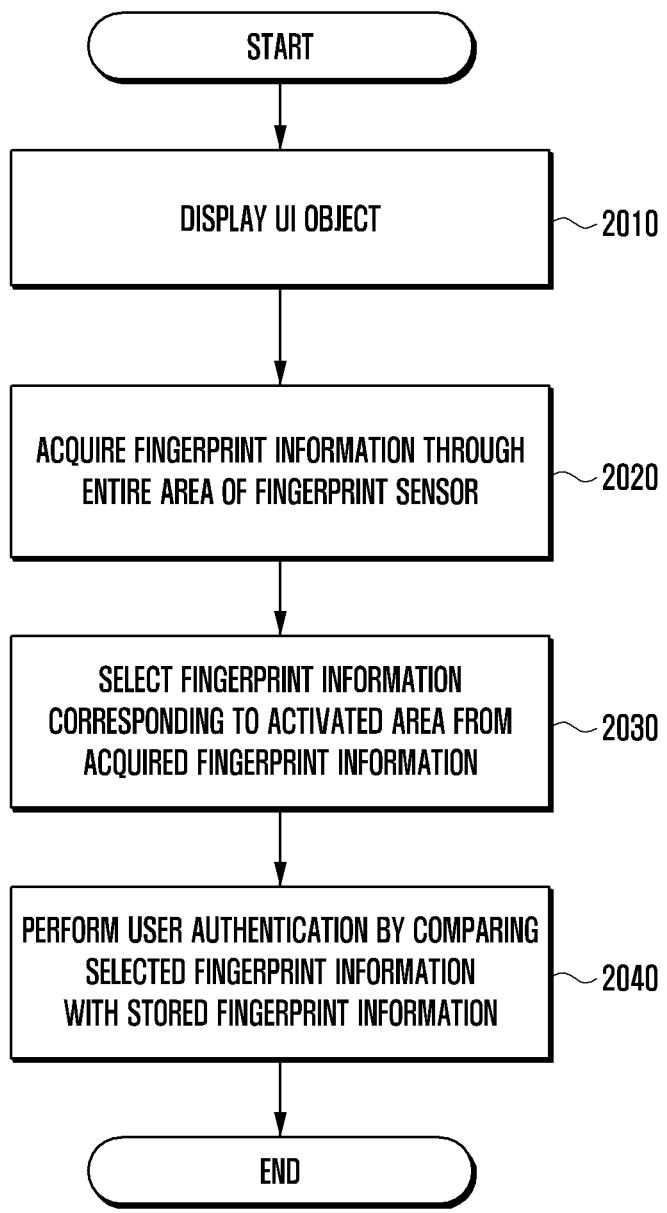
FIG. 20 is a flow diagram illustrating another example of a method for acquiring fingerprint information based on a user interface (UI) object in an electronic device according to various embodiments of the present disclosure.

FIG. 20 is a flow diagram illustrating another example of a method for acquiring fingerprint information based on a user interface (UI) object in an electronic device according to various embodiments of the present disclosure.

At operation 2010, the processor 440 may display, on the touch screen 420, a UI object (e.g., 601 in FIG. 6) for fingerprint authentication. At this time, the processor 440 may drive the fingerprint sensor 410 to be in a standby state capable of receiving a user's fingerprint input.

At operation 2020, the processor 440 may determine the entire area of the fingerprint sensor 410 as a fingerprint sensing area and then acquire user fingerprint information through the fingerprint sensing area of the fingerprint sensor 410.

At operation 2030, the processor 440 may select, from the acquired user fingerprint information, final user fingerprint information corresponding to a fingerprint-sensing activated area (e.g., 605 in FIG. 6) defined by the coordinate information and size information of the UI object.

At operation 2040, the processor 440 may perform user authentication by comparing the final user fingerprint information acquired through the fingerprint-sensing activated area with the fingerprint information stored in the memory 430.

Figure 21:
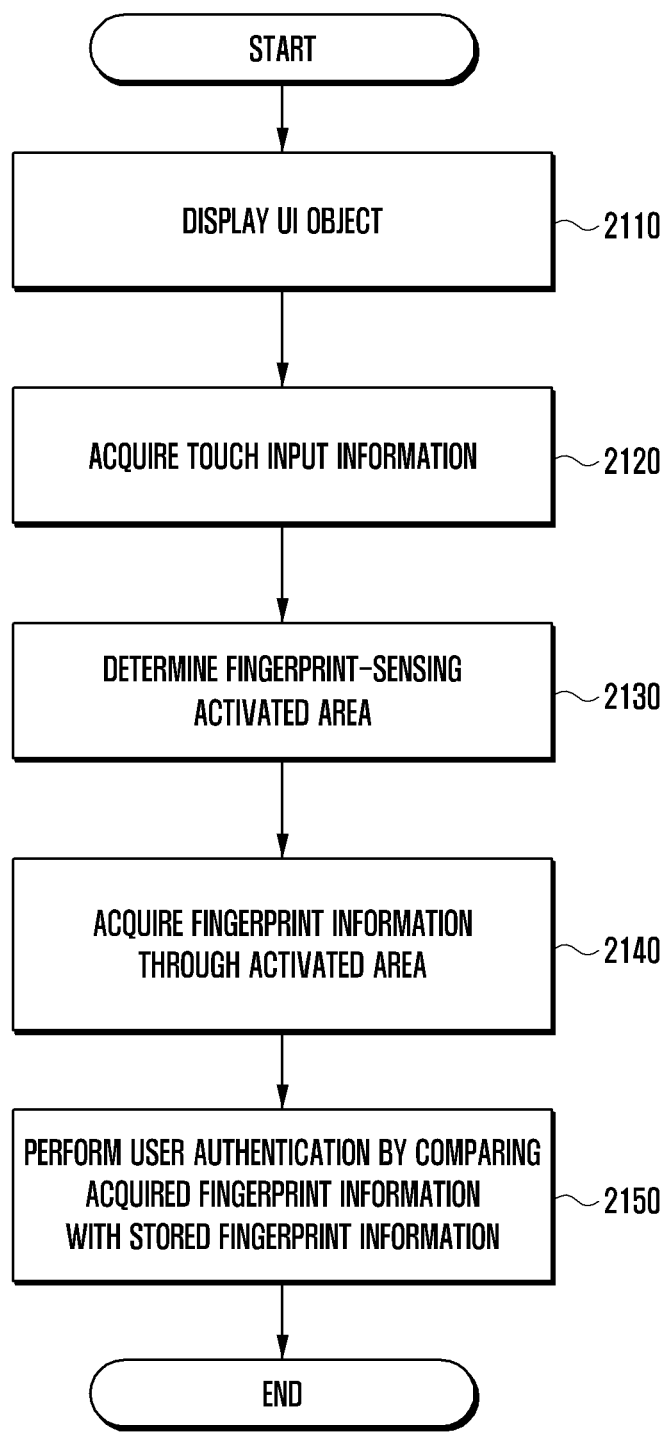
FIG. 21 is a flow diagram illustrating an example of a method for acquiring fingerprint information based on both a user interface (UI) object and user touch input information in an electronic device according to various embodiments of the present disclosure.

FIG. 21 is a flow diagram illustrating an example of a method for acquiring fingerprint information based on both a user interface (UI) object and user touch input information in an electronic device according to various embodiments of the present disclosure.

At operation 2110, the processor 440 may display, on the touch screen 420, a UI object (e.g., 601 in FIG. 6) for fingerprint authentication. At this time, the processor 440 may drive the fingerprint sensor 410 to be in a standby state capable of receiving a user's fingerprint input.

At operation 2120, the processor 440 may acquire user touch input information when the user touches the touch panel 422.

According to one embodiment, as described above in FIGS. 9 and 10, the user touch input information may be coordinate information of a touch input and height and width information of the touch input on the touch panel 422.

At operation 2130, the processor 440 may determine a fingerprint-sensing activated area (e.g., 605 in FIG. 6) corresponding to the coordinate information of the touch input and the height and width information of the touch input in the fingerprint sensing area.

At operation 2140, the processor 440 may acquire user fingerprint information through the fingerprint-sensing activated area corresponding to the user touch input information.

At operation 2150, the processor 440 may perform user authentication by comparing the user fingerprint information acquired through the fingerprint-sensing activated area with the fingerprint information stored in the memory 430.

According to one embodiment, an application programming interface (API) for the electronic device 400 to determine the fingerprint sensing area based on the UI object and the user touch input may be designed as shown in Table 2.

TABLE 2 static int MinFingerprintWidthArea = Minimum width to receive;
static int MinFingerprintHeightArea = Minimum length to receive;
booleanstartX, int startY, int width, int height) {
 if(widht < MinFingerprintWidthArea && height <
MinFingerprintHeightArea) {
return false;
}
 Set a fingerprint sensor driver 2356 with received parameter values }
void CallbackFingerprintAreaFromDisplayDriver(int x, int y)
{// x, y are center
coordinates of touch on display
SetFingerprintInputArea(x − MinFingerprrintWidth Area / 2, y −
MinFingerprrintWidthArea / 2, MinFingerprrintWidthArea,
MinFingerprrintHeightArea);
}

Figure 22:
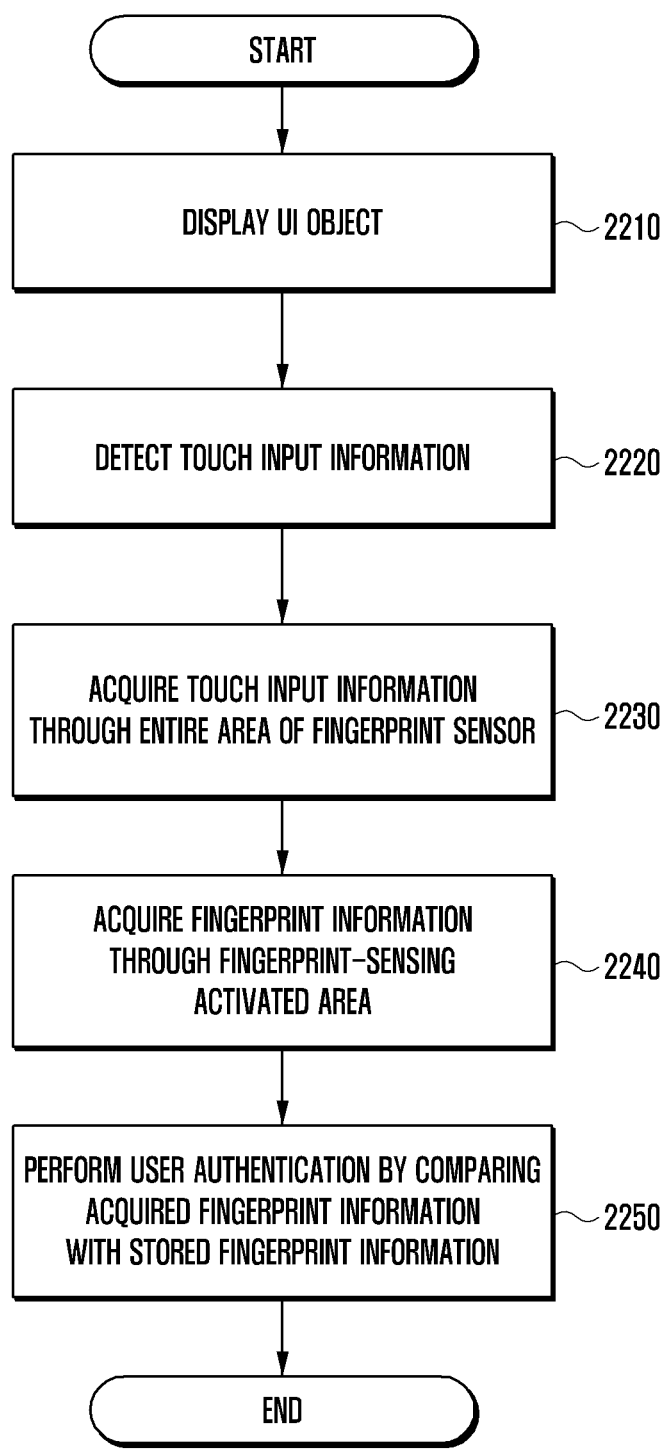
FIG. 22 is a flow diagram illustrating another example of a method for acquiring fingerprint information based on both a user interface (UI) object and user touch input information in an electronic device according to various embodiments of the present disclosure.

FIG. 22 is a flow diagram illustrating another example of a method for acquiring fingerprint information based on both a user interface (UI) object and user touch input information in an electronic device according to various embodiments of the present disclosure.

At operation 2210, the processor 440 may display, on the touch screen 420, a UI object (e.g., 601 in FIG. 6) for fingerprint authentication. At this time, the processor 440 may drive the fingerprint sensor 410 to be in a standby state capable of receiving a user's fingerprint input.

At operation 2220, the processor 440 may acquire user touch input information when the user touches the touch panel 422.

At operation 2230, the processor 440 may determine the entire area of the fingerprint sensor 410 as a fingerprint sensing area and then acquire user touch information through the fingerprint sensing area of the fingerprint sensor 410.

At operation 2240, the processor 440 may acquire user fingerprint information through a fingerprint-sensing activated area (e.g., 605 in FIG. 6) corresponding to the coordinate information and height/width information of the touch input in the acquired user touch input information.

At operation 2250, the processor 440 may perform user authentication by comparing the user fingerprint information acquired through the fingerprint-sensing activated area with the fingerprint information stored in the memory 430.

FIGS. 23 to 26 are diagrams illustrating system architectures of an electronic device according to various embodiments of the present disclosure. The system architectures shown in FIGS. 23 to 26 may include system architectures regarding methods for controlling a fingerprint sensor, based on a software layer structure stored in a memory of an electronic device according to various embodiments of the present disclosure. The following description about FIGS. 23 to 26 will focus on configuration relating to the control method of the fingerprint sensor according to various embodiments of the present disclosure, in software on the system architecture of the electronic device.

As shown in FIGS. 23 to 26, the electronic device 400 according to various embodiments of the present disclosure may store various layers of software in the memory 430, which may differ in their operations.

According to various embodiments, an application layer 2310 may include at least one application 2312. An application framework layer 2320 may include a view system 2322, a window manager 2324, a resource manager 2326, and a sensor manager 2328. A libraries (or system service) layer 2330 may include a surface manager 2332, an input manager 2334, and sensor libraries 2336. A hardware abstract layer (HAL) 2340 may include graphics 2342, a touch 2344, and a sensor 2346. A kernel layer 2350 may operate a display driver 2352, a touch driver 2354, a fingerprint sensor driver 2356, and a sensor hub driver 2358.

Figure 23:
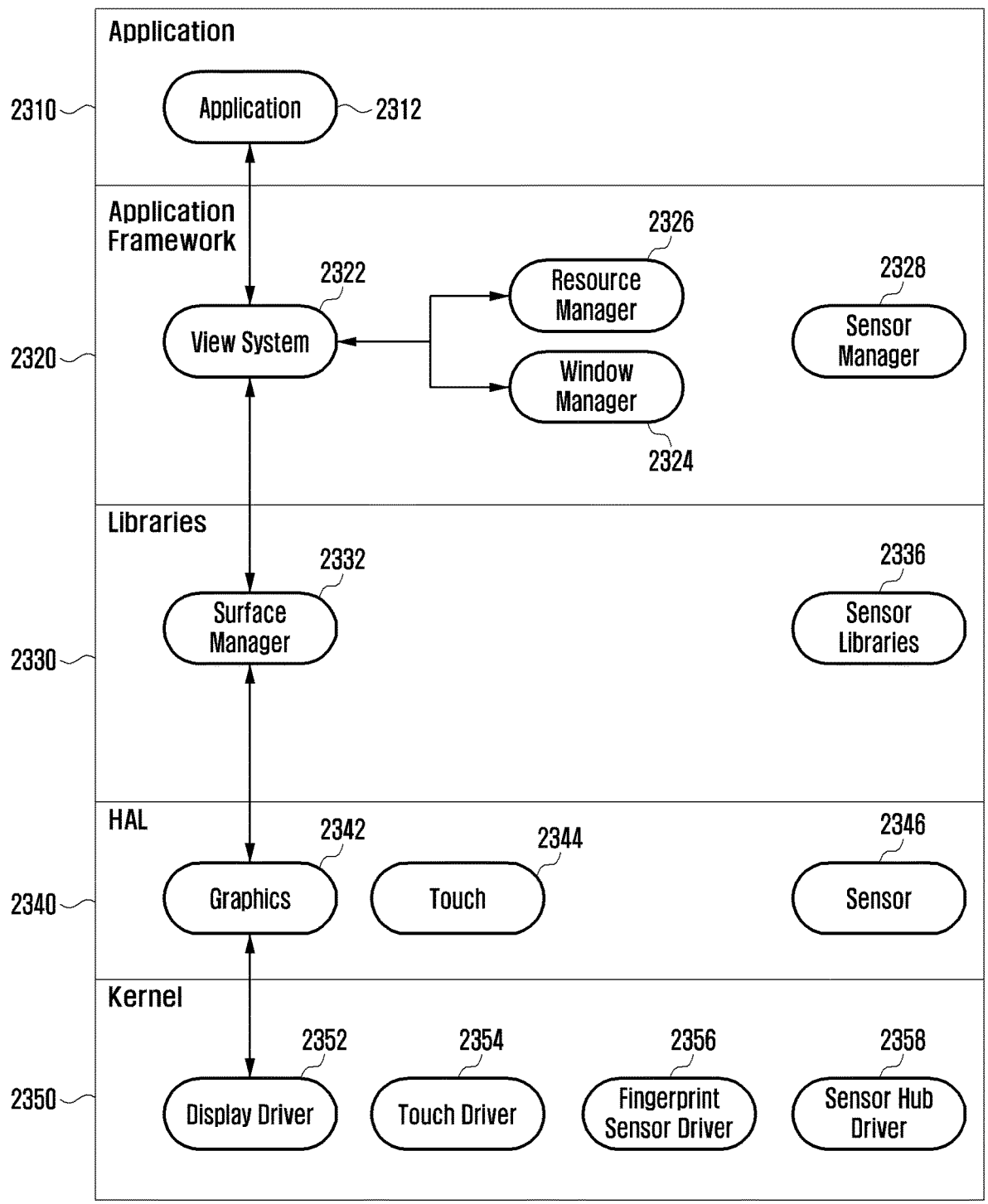
FIG. 23 is a diagram illustrating an operation of displaying a user interface (UI) in an application of an electronic device according to various embodiments of the present disclosure.

FIG. 23 is a diagram illustrating an operation of displaying a user interface (UI) in an application of an electronic device according to various embodiments of the present disclosure.

Referring to FIG. 23, the view system 2322 of the application framework layer 2320 may acquire information for configuring a UI at the request of the application 2312. Also, the view system 2322 may determine a window set to include the UI through the window manager 2324 and further determine resources to be drawn on a window through the resource manager 2326.

According to one embodiment, the view system 2322 may configure the UI on the window determined through the provided resources. Then, the UI may be displayed on the display 424 using, for example, the surface manager 2332, the graphics 2342, and the display driver 2352.

Figure 24:
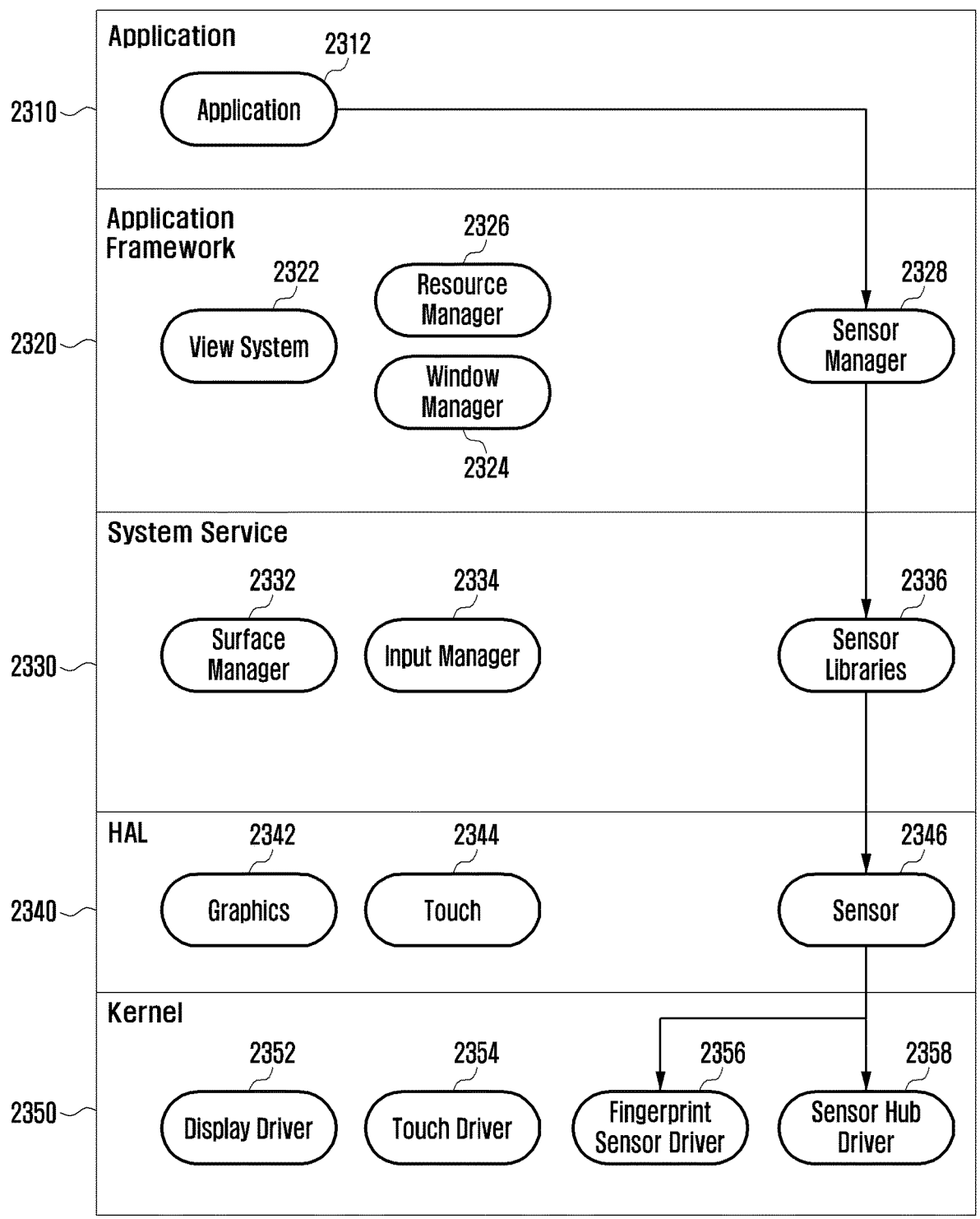
FIG. 24 is a diagram illustrating an operation of performing a fingerprint recognition function in an application of an electronic device according to various embodiments of the present disclosure.

FIG. 24 is a diagram illustrating an operation of performing a fingerprint recognition function in an application of an electronic device according to various embodiments of the present disclosure.

Referring to FIG. 24, when the application 2312 of the electronic device 400 performs a function that utilizes fingerprint recognition, the application 2312 may call an API of the sensor manager 2328 (e.g., the sensor manager 445 in FIG. 4) on the application framework layer 2320 layer to perform a fingerprint sensing function. For example, the application 2312 may deliver, to the sensor manager 2328, coordinate information of a UI for fingerprint sensing on the display 424 (e.g., the coordinates of a reference point, height and width values, the coordinates of first and second reference points, etc.) together with or in addition to the above API calling for fingerprint sensing of the sensor manager 2328.

According to one embodiment, the fingerprint sensor manager 2328 may deliver, to the sensor driver 2356 through the sensor library 2336 and the sensor 2346, a command for controlling the fingerprint sensor 410 to activate a fingerprint sensing area corresponding to the received coordinate information. Then, the fingerprint sensor driver 2356 may control the fingerprint sensor 410 according to the received command. In addition, the sensor manager 2328 may deliver the received fingerprint-sensing activated area information to the fingerprint sensor driver 2356. Then, the fingerprint sensor driver 2356 may acquire the portion corresponding to the fingerprint-sensing activated area in the entire scan image and then deliver it to a security region.

Figure 25:
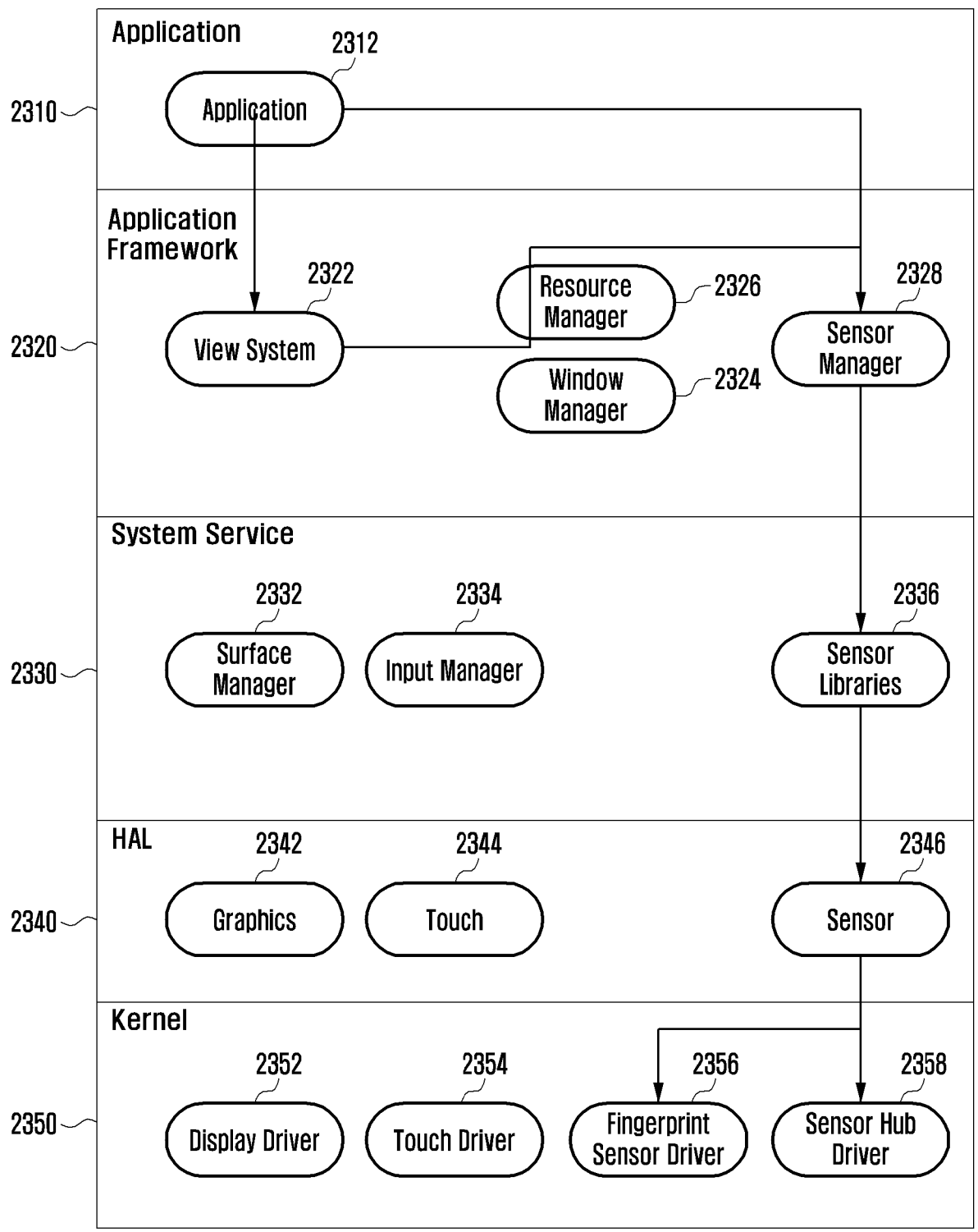
FIG. 25 is a diagram illustrating another operation of performing a fingerprint recognition function in an application of an electronic device according to various embodiments of the present disclosure.

FIG. 25 is a diagram illustrating another operation of performing a fingerprint recognition function in an application of an electronic device according to various embodiments of the present disclosure.

Referring to FIG. 25, when the application 2312 of the electronic device 400 performs a function that utilizes fingerprint recognition, the application 2312 may display a UI object through the view system 2322 on the application framework layer 2320.

Figure 26:
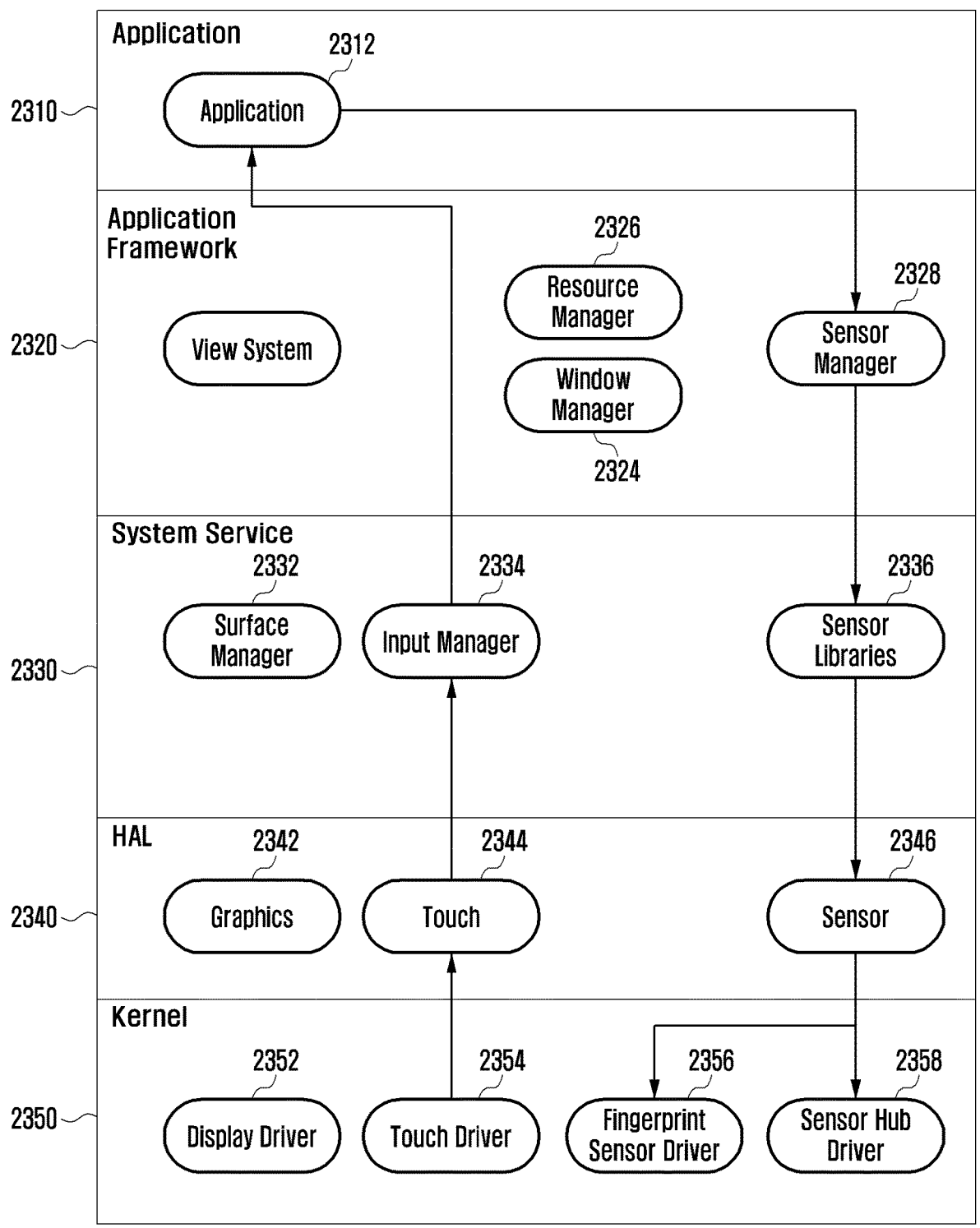
FIG. 26 is a diagram illustrating still another operation of performing a fingerprint recognition function in an application of an electronic device according to various embodiments of the present disclosure.

According to one embodiment, the application framework layer 2320 that receives a command to display the UI object for fingerprint recognition from the application 2312 may perform an operation of displaying the UI object through the display 424. In addition, the application framework layer 2320 provides the sensor manager 2328 with information about coordinate information (e.g., reference coordinate, height H and width W) of the current user interface (UI) object, And second reference coordinates, etc.). The sensor manager 2328 that receives the coordinate information of the UI object may deliver, to the fingerprint sensor driver 2356, a command for controlling the fingerprint sensor 410 to activate the fingerprint sensing area corresponding to the received coordinate information. Then, the fingerprint sensor driver 2356 may control the fingerprint sensor 410 according to the received command. FIG. 26 is a diagram illustrating still another operation of performing a fingerprint recognition function in an application of an electronic device according to various embodiments of the present disclosure.

Referring to FIG. 26, when the application 2312 of the electronic device 400 performs a function that utilizes fingerprint recognition, the application 2312 may display a UI object requiring a fingerprint input on the display 424, and wait for a user's fingerprint input in a standby state. When the user fingerprint input (e.g., a touch) is detected from the display, the touch driver 2354 may deliver the touch input coordinates to the application 2312 via the input manager 2334.

According to one embodiment, the application 2312 that receives the touch input information may call a fingerprint sensing API of the sensor manager 2328 to perform fingerprint sensing. At this time, the application 2312 may also deliver the received touch input coordinate information to the sensor manager 2328. Then, the sensor manager 2328 may deliver, to the fingerprint sensor driver 2356, a command to control the fingerprint sensor 410 to activate the fingerprint sensing area corresponding to the received touch coordinate information. Then, the fingerprint sensor driver 2356 may control the fingerprint sensor 410 according to the received command.

While the present disclosure has been particularly shown and described with reference to example embodiments thereof, it is clearly understood that the same is by way of illustration and example only and is not to be taken in conjunction with the present disclosure. It will be understood by those skilled in the art that various changes in form and details may be made therein without departing from the subject matter of the present disclosure.

What is claimed is:

1. An electronic device, comprising:
   a touch screen;
   at least one fingerprint sensor disposed under at least a part of the touch screen; and
   a processor electrically coupled to the touch screen and the at least one fingerprint sensor, wherein the processor is configured to:
   control the touch screen to display one or more graphic objects,
   obtain attribute information of at least one graphic object associated with the at least one fingerprint sensor from among the one or more graphic objects, and a dimension of at least one touch input that is contacting the touch screen and associated with the at least one graphic object,
   activate an area of the at least one fingerprint sensor associated with the at least one graphic object based on the attribute information,
   when the at least one touch input is detected partially within the at least one graphic object and partially outside the at least one graphic object, extend the activated area of the at least one fingerprint sensor to encompass an entirety of the at least one touch input including a first portion disposed inside the at least one graphic object and a second portion disposed outside the at least one graphic object, and
   obtain fingerprint information through the activated area.

2. The electronic device of claim 1, wherein the attribute information includes a coordinate of a first corner of the graphic object, and the dimension of the at least one touch input includes a height and a width of the at least one touch input, and
   wherein the activated area is bounded by at least the coordinate of the first corner, a first line extending horizontally from the coordinate matching the width, and a second line extending vertically from the coordinate matching the height.

3. The electronic device of claim 1, wherein the processor is further configured to select the area for activation based on other attribute information associated with a user input corresponding to the at least one touch input obtained through the touch screen, and wherein the other attribute information further includes coordinate information or size information for the user input, and wherein when the at least one object includes a quadrilateral shape, the extended activated area of the at least one fingerprint sensor includes a second quadrilateral shape having an extended height and width greater than the at least one object, the extended height and width of the activated area of the at least one fingerprint sensor being sufficient as to encompass a totality of the at least one touch input disposed partially outside the at least one graphic object.

4. The electronic device of claim 3, wherein the other attribute information further includes pressure information for the user input, and the processor is further configured to reduce the activated area to a region corresponding to the pressure information.

5. The electronic device of claim 1, further comprising:
a memory configured to store registered fingerprint information,
wherein the area is selected for activation based on other attribute information associated with the stored registered fingerprint information.

6. The electronic device of claim 1, wherein the at least one fingerprint sensor operates in at least one of a first sensing mode and a second sensing mode, and
wherein the processor is further configured to operate the activated area in the first sensing mode, and to operate a remaining area of the at least one fingerprint sensor different than the activated area in the second sensing mode.

7. The electronic device of claim 6, wherein acquiring the fingerprint information through the activated area is executed using the first sensing mode, and user input information is acquired through the remaining area using the second sensing mode.

8. The electronic device of claim 1, wherein the at least one fingerprint sensor includes a first fingerprint sensor and a second fingerprint sensor, and
wherein the processor is further configured to select one of the first and second fingerprint sensors for activation based on correspondence to the activated area.

9. The electronic device of claim 1, wherein the processor is further configured to ignore information acquired from a remaining area of the at least one fingerprint sensor different than the activated area.

10. The electronic device of claim 1, wherein the at least one graphic object includes a selectable display object associated with security authentication.

11. A method for controlling an electronic device, the method comprising:
controlling, by a processor, a touch screen to display one or more graphic objects;
obtaining attribute information of at least one graphic object associated with a fingerprint sensor disposed under at least a part of the touch screen from among the one or more graphic objects, and a dimension of at least one touch input that is contacting the touch screen and associated with the at least one graphic object;
activating an area of the fingerprint sensor based on the attribute information, the activated area of the fingerprint sensor associated with the at least one graphic object;
when the at least one touch input is detected partially within the at least one graphic object and partially outside the at least one graphic object, extending the activated area of the at least one fingerprint sensor to encompass an entirety of the at least one touch input including a first portion disposed inside the at least one graphic object and a second portion disposed outside the at least one graphic object; and
obtaining fingerprint information through the activated area of the fingerprint sensor.

12. The method of claim 11, wherein the attribute information includes a coordinate of a first corner of the graphic object, and the dimension of the at least one touch input includes a height and a width of the at least one touch input, and
wherein the activated area is bounded by at least the coordinate of the first corner, a first line extending horizontally from the coordinate matching the width, and a second line extending vertically from the coordinate matching the height.

13. The method of claim 11, wherein the processor is further configured to select the area for activation based on other attribute information associated with a user input corresponding to the at least one touch input obtained through the touch screen, and
wherein the other attribute information further includes coordinate information or size information for the user input, and
wherein when the at least one object includes a quadrilateral shape, the extended activated area of the at least one fingerprint sensor includes a second quadrilateral shape having an extended height and width greater than the at least one object, the extended height and width of the activated area of the at least one fingerprint sensor being sufficient as to encompass a totality of the at least one touch input disposed partially outside the at least one graphic object.

14. The method of claim 13, wherein the other attribute information further includes pressure information for the user input, and the processor is further configured to reduce the activated area to a region corresponding to the pressure information.

15. The method of claim 11, wherein the area is selected for activation based on other attribute information associated with registered fingerprint information stored in a memory.

16. The method of claim 11, wherein the fingerprint sensor operates in at least one of a first sensing mode and a second sensing mode, the method further comprising operating the activated area in the first sensing mode, and operating a remaining area of the fingerprint sensor different than the activated area in the second sensing mode.

17. The method of claim 16, wherein acquiring the fingerprint information through the activated area is executed using the first sensing mode, and user input information is acquired through the remaining area using the second sensing mode.

18. The method of claim 11, wherein the fingerprint sensor includes a first fingerprint sensor and a second fingerprint sensor, the method further comprising selecting one of the first and second fingerprint sensors for activation based on correspondence to the activated area.

19. The method of claim 11, further comprising ignoring information acquired from a remaining area of the fingerprint sensor different than the activated area.

20. A non-transitory computer-readable recording medium recording programming instructions, which when executed by a processor, cause the processor to:
control a touch screen to display one or more graphic objects;
obtain attribute information of at least one graphic object associated with a fingerprint sensor disposed under at least a part of the touch screen from among the one or more graphic objects and a dimension of at least one touch input that is contacting the touch screen and associated with the at least one graphic object;

activate an area of the fingerprint sensor based on the attribute information, the activated area of the fingerprint sensor associated with the at least one graphic object;

when the at least one touch input is detected partially within the at least one graphic object and partially outside the at least one graphic object, extending the activated area of the at least one fingerprint sensor to encompass an entirety of the at least one touch input including a first portion disposed inside the at least one graphic object and a second portion disposed outside the at least one graphic object; and obtain fingerprint information through the activated area of the fingerprint sensor.

\* \* \* \* \*